United States Patent
Nakagawa et al.

(10) Patent No.: US 8,440,333 B2
(45) Date of Patent: *May 14, 2013

(54) FUEL CELL AND ELECTRONIC APPARATUS

(75) Inventors: Takaai Nakagawa, Kanagawa (JP); Hideki Sakai, Kanagawa (JP); Taiki Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 501 days.

This patent is subject to a terminal disclaimer.

(21) Appl. No.: 12/664,321

(22) PCT Filed: Mar. 12, 2008

(86) PCT No.: PCT/JP2008/054501
§ 371 (c)(1), (2), (4) Date: Dec. 11, 2009

(87) PCT Pub. No.: WO2008/152841
PCT Pub. Date: Dec. 18, 2008

(65) Prior Publication Data
US 2010/0221644 A1  Sep. 2, 2010

(30) Foreign Application Priority Data
Jun. 13, 2007  (JP) ................. 2007-155973

(51) Int. Cl.
  *H01M 8/16* (2006.01)
(52) U.S. Cl.
  USPC ............................... 429/1; 429/401
(58) Field of Classification Search .............. 429/2, 188, 429/401, 498; 435/25–27, 205, 183, 195; 204/403.01, 403.04, 403.14
See application file for complete search history.

(56) References Cited

U.S. PATENT DOCUMENTS

| | | | |
|---|---|---|---|
| 3,340,094 A | * | 9/1967 | Helmuth .................... 429/2 |
| 3,511,906 A | * | 5/1970 | Bergemann et al. ......... 264/262 |
| 4,865,836 A | | 9/1989 | Long, Jr. |

(Continued)

FOREIGN PATENT DOCUMENTS

| | | |
|---|---|---|
| EP | 2131437 A1 | 12/2009 |
| JP | 5-502857 | 5/1993 |

(Continued)

OTHER PUBLICATIONS

International Search Report dated May 28, 2008, for corresponding Patent Application PCT/JP2008/054501

(Continued)

*Primary Examiner* — Joseph Drodge
(74) *Attorney, Agent, or Firm* — K&L Gates LLP

(57) ABSTRACT

A fuel cell is provided having excellent performance and being capable of achieving a sufficient buffer ability in a high-output operation when an enzyme is immobilized on at least one of a positive electrode and a negative electrode and of sufficiently exhibiting the ability inherent in the enzyme. A biofuel cell includes a structure in which a positive electrode and a negative electrode are opposed to each other with an electrolyte layer containing a buffer material provided therebetween, an enzyme being immobilized on at least one of the positive electrode and the negative electrode. The electrolyte layer contains as the buffer material a compound including an imidazole ring. As the compound including an imidazole ring, imidazole, 1-methylimidazole, 2-methylimidazole, 4-methylimidazole, 2-ethylimidazole, or the like is used.

16 Claims, 25 Drawing Sheets

U.S. PATENT DOCUMENTS

| | | | |
|---|---|---|---|
| 6,294,281 B1 * | 9/2001 | Heller | 429/401 |
| 7,544,438 B2 * | 6/2009 | Nishizawa et al. | 429/401 |
| 7,632,600 B2 * | 12/2009 | Kubo et al. | 429/401 |
| 2006/0177716 A1 * | 8/2006 | Saito et al. | 429/33 |
| 2007/0026295 A1 * | 2/2007 | Angell et al. | 429/46 |
| 2007/0117017 A1 * | 5/2007 | Sugiyama et al. | 429/231.95 |
| 2007/0122689 A1 | 5/2007 | Kubo et al. | |
| 2007/0131547 A1 * | 6/2007 | Nomoto et al. | 204/403.01 |
| 2007/0269710 A1 * | 11/2007 | Hirano et al. | 429/46 |

FOREIGN PATENT DOCUMENTS

| | | |
|---|---|---|
| JP | 2000-133297 | 5/2000 |
| JP | 2003-282124 | 10/2003 |
| JP | 2004-071559 | 3/2004 |
| JP | 2004-521881 | 7/2004 |
| JP | 2004521881 | 7/2004 |
| JP | 2005-013210 | 1/2005 |
| JP | 2005-84042 | 3/2005 |
| JP | 2005-310613 | 11/2005 |
| JP | 2006-024555 | 1/2006 |
| JP | 2006-049215 | 2/2006 |
| JP | 2006-093090 | 4/2006 |
| JP | 2006-127957 | 5/2006 |
| JP | 2006-156354 | 6/2006 |
| JP | 2006156354 | 6/2006 |
| JP | 2006164945 | 6/2006 |
| JP | 2007-87627 | 4/2007 |
| JP | 2007-103307 | 4/2007 |
| WO | WO 91/04664 | 4/1991 |
| WO | 2006/009324 A1 | 1/2006 |
| WO | 2007/049326 | 5/2007 |

OTHER PUBLICATIONS

Notification of Transmittal of Translation of the International Preliminary Report on Patentability and Written Opinion of the International Searching Authority dated Dec. 30, 2009.

European Search Report issued Dec. 6, 2011, for corresponding European Appln. No. 08721917.6.

Japanese Office Action issued Sep. 11, 2012, corresponding to Japanese Application No. 2007-155973.

"One Point for High Polymer Advanced Materials 7," Fuel Cell and High Polymer, Kyoritsu Shuppan Co., Ltd., Nov. 10, 2005, First Edition, pp. 77-78.

Notice of reasons for refusal issued in connection with Japanese Patent Application No. 2007-155973, dated Dec. 11, 2012. (2 pages).

* cited by examiner

FIG. 15
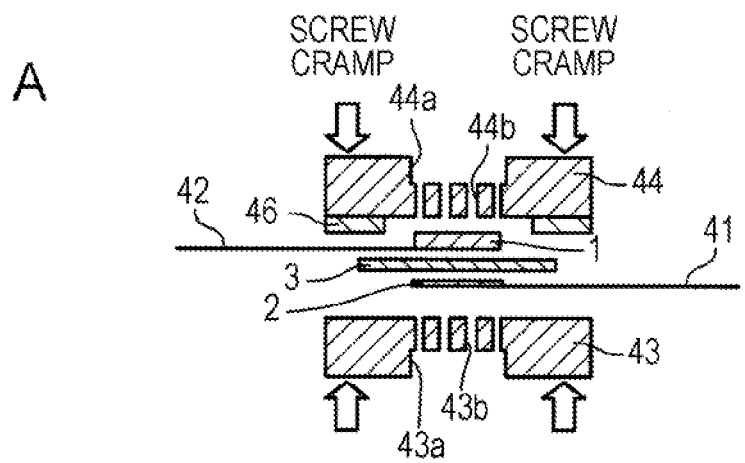
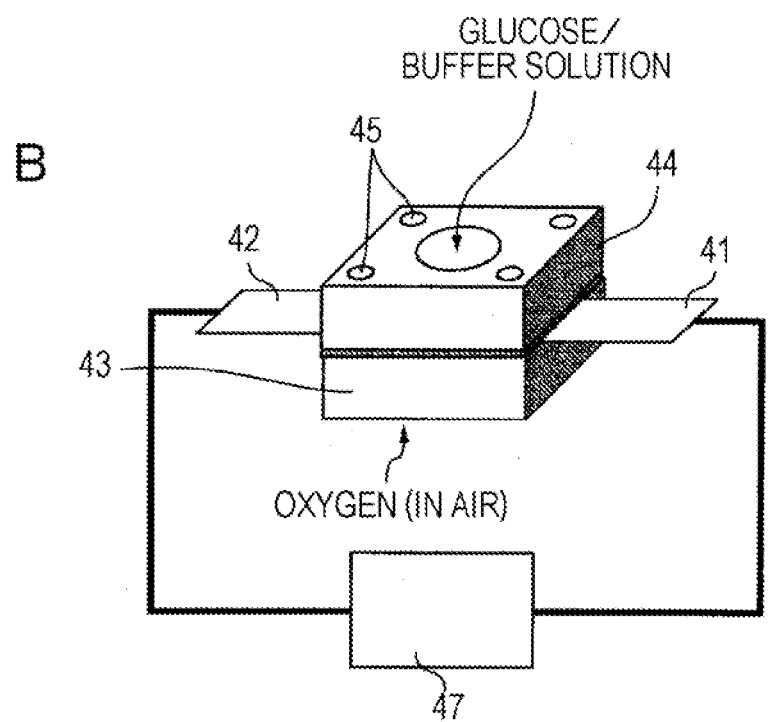

FIG. 21
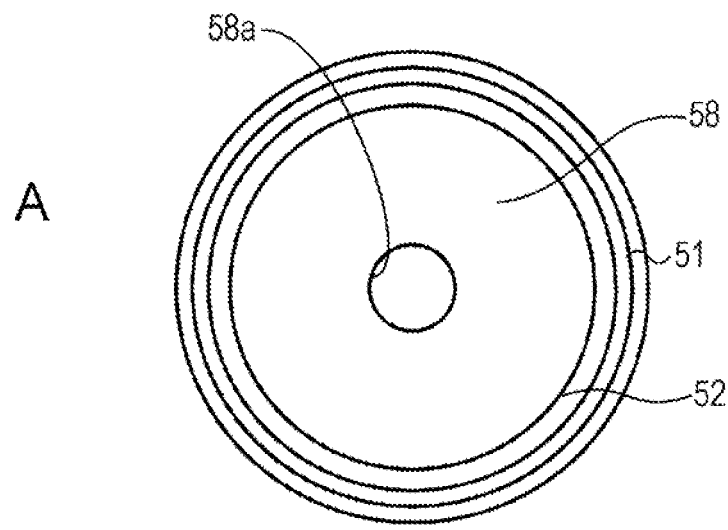
A
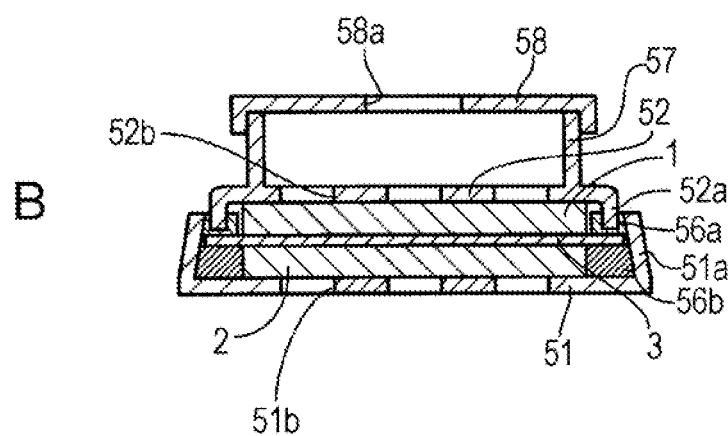
B
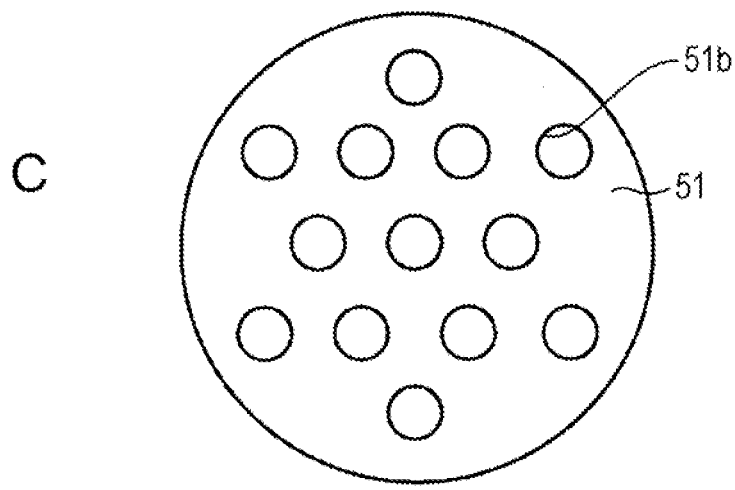
C

FIG. 30
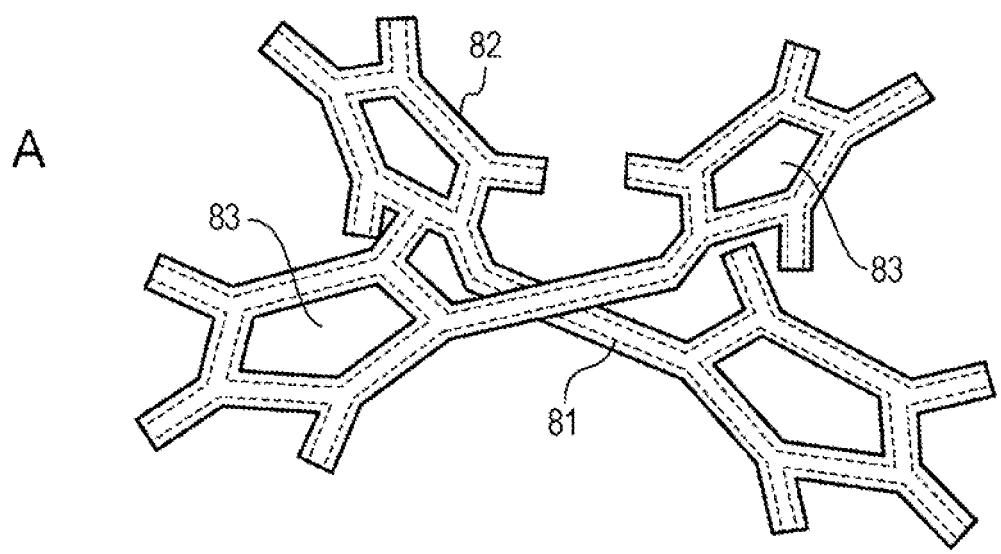
A
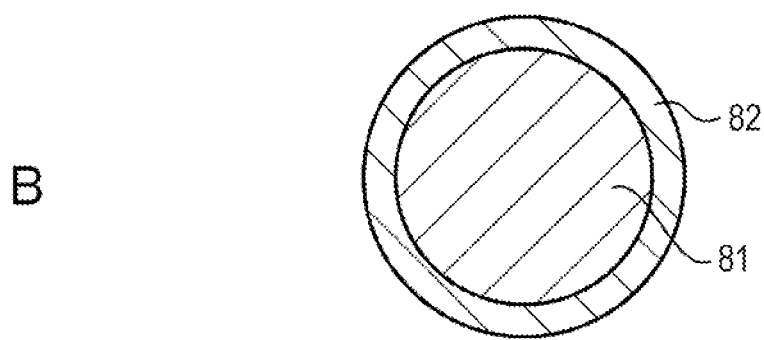
B

FIG. 31
A
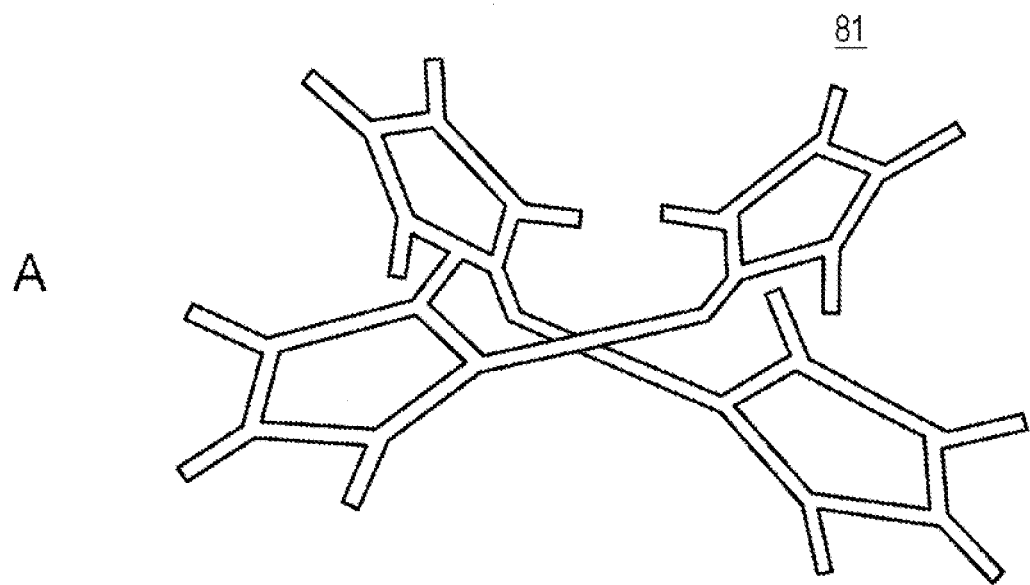
B
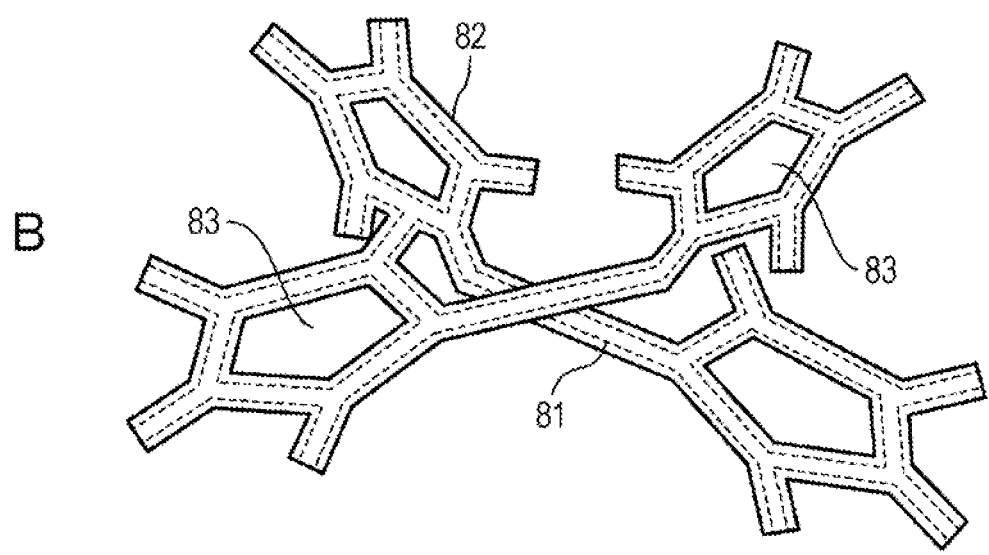

FUEL CELL AND ELECTRONIC APPARATUS

CROSS REFERENCE TO RELATED APPLICATIONS

The present application is a National Stage of International Application No. PCT/JP2008/054501 filed on Mar. 12, 2008 and which claims priority to Japanese Patent Application No. 2007-155973 filed on Jun. 13, 2007, the entire contents of which are being incorporated herein by reference.

BACKGROUND

The present invention relates to a fuel cell including an enzyme immobilized on at least one of a positive electrode and a negative electrode and to an electronic apparatus using the fuel cell.

Fuel cells have a structure in which a positive electrode (oxidizer electrode) and a negative electrode (fuel electrode) are opposed to each other with an electrolyte (proton conductor) provided therebetween. In a conventional fuel cell, fuel (hydrogen) supplied to a negative electrode is decomposed into electrons and protons ($H^+$) by oxidation, the electrons are supplied to the negative electrode, and $H^+$ moves to the positive electrode through the electrolyte. On the positive electrode, $H^+$ reacts with oxygen supplied from the outside and the electrons supplied from the negative electrode through an external circuit to produce $H_2O$.

Therefore, a fuel cell is a high-efficiency generating apparatus which directly converts chemical energy possessed by fuel to electric energy, and is capable of utilizing, with high efficiency, electric energy from chemical energy possessed by fossil fuel, such as natural gas, petroleum, and coal, regardless of an operation place and operation time. Consequently, fuel cells have been actively researched and developed as applications to large-scale power generation. For example, an actual performance has proved that a fuel cell provided on a space shuttle can supply electric power and water for crews and is a clean generating apparatus.

Further, fuel cells such as solid polymer-type fuel cells, which show a relatively low operation temperature range from room temperature to about 90° C., have recently been developed and attracted attention. Therefore, not only application to large-scale power generation but also application to small systems such as driving power supplies of automobiles and portable power supplies of personal computers and mobile devices are being searched for.

Thus, fuel cells are considered to be widely used for applications including large-scale power generation and small-scale power generation and attract much attention as high-efficiency generating apparatuses. However, fuel cells generally use, as fuel, natural gas, petroleum, or coal which is converted to hydrogen gas by a reformer, and thus have various problems of the consumption of limited resources, the need to heat to a high temperature, the need for an expensive noble metal catalyst such as platinum (Pt), and the like. In addition, even when hydrogen gas or methanol is directly used as fuel, it is necessary to take caution to handling thereof.

Therefore, attention is paid to the fact that biological metabolism in living organisms is a high-efficiency energy conversion mechanism, and its application to fuel cells has been proposed. The biological metabolism includes aspiration and photosynthesis taking place in microorganism cells. The biological metabolism has the characteristic that the generation efficiency is very high, and reaction proceeds under mild conditions such as room temperature.

For example, aspiration is a mechanism in which nutrients such as saccharides, fat, and proteins are taken into microorganisms or cells, and the chemical energy thereof is converted to oxidation-reduction energy, i.e., electric energy, by a process of producing carbon dioxide ($CO_2$) through a glycolytic system including various enzyme reaction steps and a tricarboxylic acid (TCA) cycle, in which nicotinamide-adenine dinucleotide ($NAD^+$) is reduced to reduced nicotinamide-adenine dinucleotide (NADH). Further, in an electron transfer system, the electric energy of NADH is converted directly into proton gradient electric energy, and oxygen is reduced, producing water. The electric energy obtained in this mechanism is utilized for reaction necessary for producing ATP from adenosine diphosphate (ADP) through an adenosine triphosphate (ATP) synthetase, and ATP is used for a reaction necessary for growing microorganisms or cells. Such energy conversion takes place in plasmasol and mitochondoria.

In addition, photosynthesis is a mechanism in which light energy is taken in, and water is oxidized to produce oxygen by a process of converting to electric energy by reducing nicotinamide-adenine dinucleotide phosphate ($NADP^+$) to reduced nicotinamide-adenine dinucleotide phosphate (NADPH) through an electron transfer system. The electric energy is utilized for a carbon immobilization reaction in which $CO_2$ is taken in to synthesize carbohydrates.

As a technique for utilizing the above-mentioned biological metabolism in a fuel cell, there has been reported a microbial cell in which electric energy generated in microorganisms is taken out from microorganisms through an electron mediator, and the electrons are supplied to an electrode to produce a current (refer to, for example, Japanese Unexamined Patent Application Publication No. 2000-133297).

However, there are many unnecessary reactions other than the desired reaction for converting chemical energy to electric energy in microorganisms and cells, and thus electric energy is consumed for an undesired reaction in the above-described method, thereby failing to exhibit a sufficient energy conversion efficiency.

Therefore, there have been proposed fuel cells (biofuel cells) in which only a desired reaction is effected using an enzyme (refer to, for example, Japanese Unexamined Patent Application Publication No. 2003-282124, Japanese Unexamined Patent Application Publication No. 2004-71559, Japanese Unexamined Patent Application Publication No. 2005-13210, Japanese Unexamined Patent Application Publication No. 2005-310613, Japanese Unexamined Patent Application Publication No. 2006-24555, Japanese Unexamined Patent Application Publication No. 2006-49215, Japanese Unexamined Patent Application Publication No. 2006-93090, Japanese Unexamined Patent Application Publication No. 2006-127957, and Japanese Unexamined Patent Application Publication No. 2006-156354). As the biofuel cells, there have been developed biofuel cells in which fuel is decomposed into protons and electrons by an enzyme, an alcohol such as methanol or ethanol, or a monosaccharide such as glucose being used as the fuel.

The biofuel cell includes an electrolyte generally containing a buffer material (buffer solution). This is intended for controlling pH to near pH at which an enzyme easily functions with the buffer material because an enzyme used as a catalyst is very sensitive to pH of a solution. As the buffer material, sodium dihydrogen phosphate ($NaH_2PO_4$), 3-(N-morpholino)propanesulfonic acid (MOPS), N-2-hydroxyethylpiperazine-N'-2-ethanesulfonic acid (HEPES), and the like are conventionally used. The concentration of the buffer material is generally 0.1 M or less. This is because generally, the concentration of the buffer material is diluted to the minimum level required for maintaining pH constant, and appropriate inorganic ions or organic ions are added for creating approximately physiological conditions.

However, according to research conducted by the inventors, when in the above-described conventional biofuel cell using $NaH_2PO_4$, MOPS, HEPES, or the like as the buffer material contained in the electrolyte, an enzyme immobilized on a high-surface-area electrode such as porous carbon is used or the concentration of immobilized enzyme is increased to increase output, the pH of the electrolyte around the enzyme deviates from optimum pH due to the insufficient buffer ability, and the ability inherent in the enzyme cannot be sufficiently exhibited.

Accordingly, it is desirable to provide a fuel cell having excellent performance and capable of producing a sufficient buffer ability even in a high-output operation and sufficiently exhibiting the ability inherent in an enzyme when an enzyme is immobilized on at least one of a positive electrode and a negative electrode.

It is further desirable to provide an electronic apparatus using the above-described excellent fuel cell.

SUMMARY

A first embodiment relates to a fuel cell including a structure in which positive and negative electrodes are opposed to each other with an electrolyte containing a buffer material provided therebetween, an enzyme being immobilized on at least one of the positive and negative electrodes, the fuel cell being characterized in that the buffer material contains a compound containing an imidazole ring.

Examples of the compound containing an imidazole ring include imidazole, triazole, pyridine derivatives, bipyridine derivatives, and imidazole derivatives (histidine, 1-methylimidazole, 2-methylimidazole, 4-methylimidazole, 2-ethylimidazole, ethyl imidazole-2-carboxylate, imidazole-2-carboxyaldehyde, imidazole-4-carboxylic acid, imidazole-4,5-dicarboxylic acid, imidazol-1-yl-acetic acid, 2-acetylbenzimidazole, 1-acetylimidazole, N-acetylimidazole, 2-aminobenzimidazole, N-(3-aminopropyl)imidazole, 5-amino-2-(trifluoromethyl)benzimidazole, 4-azabenzimidazole, 4-aza-2-mercaptobenzimidazole, benzimidazole, 1-benzylimidazole, and 1-butylimidazole). The concentration of the compound containing an imidazole ring can be appropriately selected, but from the viewpoint of achieving a sufficient buffer ability, the concentration is preferably 0.2 M to 3 M, more preferably 0.2 M to 2.5 M, and still more preferably 1 M to 2.5 M. In this way, when the concentration of the buffer material contained in the electrolyte is as sufficiently high as 0.2 M to 3 M, if the proton amount varies in an electrode or in an enzyme-immobilized membrane by enzymatic reaction through proton during a high-output operation, a sufficient buffer function can be achieved, deviation of pH of the electrolyte around the enzyme from optimum pH can be sufficiently suppressed, and the ability inherent in the enzyme can be sufficiently exhibited. $pK_a$ of the buffer material is generally 5 to 9. The pH of the electrolyte containing the buffer material is preferably near 7 but may be any one of 1 to 14.

The buffer material may contain a buffer material other than the compound containing an imidazole ring according to demand. Examples of such a buffer material include dihydrogen phosphate ion ($H_2PO_4^-$), 2-amino-2-hydroxymethyl-1,3-propanediol (abbreviated as "tris"), 2-(N-morpholino) ethanesulfonic acid (MES), cacodylic acid, carbonic acid ($H_2CO_3$), hydrogen citrate ion, N-(2-acetamido)iminodiacetic acid (ADA), piperazine-N,N'-bis(2-ethanesulfonic acid) (PIPES), N-(2-acetamido)-2-aminoethanesulfonic acid (ACES), 3-(N-morpholino)propanesulfonic acid (MOPS), N-2-hydroxyethylpiperazine-N'-2-ethanesulfonic acid (HEPES), N-2-hydroxyethylpiperazine-N'-3-propanesulfonic acid (HEPPS), N-[tris(hydroxymethyl)methyl]glycine (abbreviated as "tricine"), glycylglycine, and N,N-bis(2-hydroxyethyl)glycine (abbreviated as "bicine").

As the electrolyte, various electrolytes can be used, and the electrolyte is selected according to demand. Examples of the electrolyte include cellophane, a perfluorocarbon sulfonic acid (PFS) resin membrane, a trifluorostyrene derivative copolymer membrane, a polybenzimidazole membrane impregnated with phosphoric acid, an aromatic polyether ketone sulfonic acid membrane, PSSA-PVA (polystyrenesulfonic acid-polyvinyl alcohol copolymer), PSSA-EVOH (polystyrenesulfonic acid-ethylene vinyl alcohol copolymer), ion exchange resins containing fluorine-containing carbon sulfonic acid groups (e.g., Nafion (trade name, US DuPont)), and the like.

The enzyme immobilized on at least one of the positive electrode and the negative electrode may be any one of various enzymes and is selected according to demand. Preferably, in addition to the enzyme, an electron mediator is immobilized on at least one of the positive electrode and the negative electrode. According to demand, the buffer material containing the compound containing an imidazole ring may be immobilized on an enzyme/electron mediator immobilized membrane.

Specifically, for example, when a monosaccharide such as glucose is used as fuel, the enzyme immobilized on the negative electrode contains an oxidase which promotes oxidation of a monosaccharide and decomposes the monosaccharide, and usually further contains a coenzyme oxidase which returns a coenzyme reduced with the oxidase to an oxidized form. When a coenzyme returns to an oxidized from by the action of the coenzyme oxidase, electrons are produced and supplied to an electrode from the coenzyme oxidase through the electron mediator. For example, $NAD^+$-dependent glucose dehydrogenase (GDH) is used as the oxidase, nicotinamide-adenine dinucleotide ($NAD^+$) is used as the coenzyme, and diaphorase is used as the coenzyme oxidase.

When a polysaccharide (in a broad sense, including all carbohydrates which yield at least two molecules of monosaccharide by hydrolysis, such as disaccharides, trisaccharides, tetrasaccharides, and the like) is used as the fuel, in addition to the oxidase, preferably, the coenzyme oxidase, the coenzyme, and the electron mediator, a catabolic enzyme which accelerates decomposition such as hydrolysis of a polysaccharide to produce a monosaccharide such as glucose is immobilized. Examples of polysaccharides include starch, amylose, amylopectin, glycogen, cellulose, maltose, sucrose, and lactose. Any one of these polysaccharides is composed of two or more monosaccharides and contains glucose as a monosaccharide of a bond unit. Amylose and amylopectin are components in starch which is composed of a mixture of amylose and amylopectin. When glucoamylase and glucose dehydrogenase are used as a catabolic enzyme for a polysaccharide and an oxidase for decomposing a monosaccharide, respectively, a polysaccharide which can be decomposed to glucose with glucoamylase, for example, any one of starch, amylose, amylopectin, glycogen, and maltose, may be contained in the fuel, for permitting power generation. Glucoamylase is a catabolic enzyme which hydrolyzes α-glucan such as starch to produce glucose, and glucose dehydrogenase is an oxidase which oxidizes β-D-glucose to D-glucono-δ-lactone. In a preferred configuration, a catabolic enzyme which decomposes a polysaccharide is immobilized on the negative electrode, and also a polysaccharide finally used as the fuel is immobilized on the negative electrode.

When starch is used as fuel, the starch used can be gelatinized to form gelled solid fuel. In this case, a method can be preferably used, in which the gelatinized starch is brought into contact with the negative electrode on which the enzyme is immobilized or immobilized on the negative electrode together with the enzyme. When such an electrode is used, the concentration of starch on the surface of the negative electrode can be kept higher than that when a solution of starch is used, thereby increasing the rate of decomposition reaction with the enzyme. As a result, output is improved, and the fuel is easier to handle than the starch solution, thereby simplifying a fuel supply system. Further, the fuel cell may be turned over and is thus very advantageous in, for example, use for mobile devices.

As the electron mediator, basically, any material may be used, but a compound having a quinone skeleton, particularly a naphthoquinone skeleton, is preferably used. As the compound having a naphthoquinone skeleton, various naphthoquinone derivatives can be used. Examples of such derivatives include 2-amino-1,4-naphthoquinone (ANQ), 2-amino-3-methyl-1,4-naphthoquinone (AMNQ), 2-methyl-1,4-naphthoquinone (VK3), 2-amino-3-carboxy-1,4-naphthoquinone (ACNQ), and the like. As the compound having a quinone skeleton, for example, anthraquinone and its derivatives other than the compound having a naphthoquinone skeleton can be used. According to demand, besides the compound having a quinone skeleton, at least one other compound serving as the electron mediator may be contained. As a solvent used for immobilizing the compound having a quinone skeleton, particularly, the compound having a naphthoquinone skeleton, on the negative electrode, acetone is preferably used. When acetone is used as the solvent, the solubility of the compound having a quinone skeleton can be increased, and thus the compound having a quinone skeleton can be effectively immobilized on the negative electrode. The solvent may further contain at least one solvent other than acetone according to demand.

In an example, 2-methyl-1,4-naphthoquinone (VK3) as the electron mediator, reduced nicotinamide-adenine dinucleotide (NADH) as the coenzyme, glucose dehydrogenase as the oxidase coenzyme, and diaphorase as the coenzyme oxidase are immobilized on the negative electrode, preferably at an immobilization ratio of 1.0 (mol):0.33 to 1.0 (mol):(1.8 to 3.6)×$10^6$ (U):(0.85 to 1.7)×$10^7$ (U). However, U (unit) is an index showing an enzyme activity, i.e., a degree of reaction of 1 μmol of substrate per minute at a certain temperature and pH.

On the other hand, when the enzyme is immobilized on the positive electrode, the enzyme typically contains an oxygen-reductase. As the oxygen-reductase, for example, bilirubin oxidase, laccase, ascorbate oxidase, or the like can be used. In this case, in addition to the enzyme, the electron mediator is preferably immobilized on the positive electrode. As the electron mediator, for example, potassium hexacyanoferrate, potassium ferricyanide, potassium octacyanotungstate, or the like is used. The electron mediator is preferably immobilized at a sufficiently high concentration, for example, 0.64×$10^{-6}$ mol/$mm^2$ or more in average.

As the immobilization material for immobilizing the enzyme, the coenzyme, the electron mediator, and the like on the negative electrode or the positive electrode, various materials may be used. Preferably, a polyion complex formed using polycation, such as poly-L-lysine (PLL), or its salt and polyanion, such as polyacrylic acid (e.g., sodium polyacrylate (PAAcNa)), or its salt may be used. The enzyme, the coenzyme, the electron mediator, and the like can be contained in the polyion complex.

In addition, when the electron mediator is immobilized on the positive and negative electrodes of the fuel cell, because the electron mediator generally has a low molecular weight, it is not necessary easy to completely suppress elusion of the electron mediator and maintain a state in which the electron mediator is immobilized on the positive and negative electrodes for a long time. Therefore, the electron mediator used on the positive electrode moves to the negative electrode side, and conversely the electron mediator used on the negative electrode moves to the positive electrode side, thereby possibly causing decrease output of the fuel cell and decrease in electric capacitance. In order to resolve this problem, it is effective to use as the electrolyte an electrolyte having charge with the same sign as that of charge of an oxidized form or reduced form of the electron mediator. In this method, repulsive force exerts between the charge of the electrolyte and the charge of the oxidized form or reduced form of the electron mediator. Therefore, the electron mediator little moves to the electrolyte side, and the electron mediator can be effectively suppressed from moving to the opposite side through the electrolyte. Typically, when the electrolyte contains a polymer having charge with the same sign as the charge of the oxidized form or reduced form of the electron mediator, for example, polyanion or polycation, the electrolyte has charge with the same sign as the charge of the oxidized form or reduced form of the electron mediator. The electrolyte is not limited to this, and another method may be used for allowing the electrolyte to have charge with the same sign as the charge of the oxidized form or reduced form of the electron mediator. Specifically, when the oxidized form or reduced form of the electron mediator used on at least one of the positive and negative electrodes has negative charge, the electrolyte contains a polymer having negative charge, for example, polyanion, while when the oxidized form or reduced form of the electron mediator has positive charge, the electrolyte contains a polymer having positive charge, for example, polycation. As the polyanion, for example, Nafion (trade name, US DuPont), which is an ion exchange resin containing fluorine-containing carbon sulfonic acid groups, dichromate ion ($Cr_2O_7^{2-}$), paramolybdate ion ($[Mo_7O_{24}]^{6-}$), polyacrylic acid (e.g., sodium polyacrylate (PAAcNa)), and the like can be used. As the polycation, for example, poly-L-lysine (PLL) and the like can be used.

On the other hand, the output of the fuel cell can be significantly increased by immobilizing on the negative electrode a phospholipid such as dimyristoyl phosphatidyl coline (DMPC) in addition to the enzyme and the electron mediator. Namely, the inventors have found that a phospholipid functions as an output increasing agent. As a result of various studies on a reason why output is increased by immobilizing a phospholipid, it has been concluded that separation and aggregation of the enzyme and the electron mediator can be prevented by immobilization of the phospholipid, thereby uniformly mixing the enzyme and the electron mediator, while in a conventional fuel cell, sufficiently large output is not obtained for the reason that the enzyme and the electron mediator, which are immobilized on the negative electrode, are not uniformly mixed, causing separation and aggregation of the enzyme and the electron mediator. Further, as a result of research on the cause of uniform mixing of the enzyme and the electron mediator due to the addition of the phospholipid, there has been found the rare phenomenon that the diffusion coefficient of a reduced form of the electron mediator is significantly increased by adding the phospholipid. In other words, it has been found that the phospholipid functions as an electron mediator diffusion promoter. The effect of immobilization of the phospholipid is particularly significant when the electron mediator is the compound having a quinone skeleton. The same effect can be obtained even by using a phospholipid derivative or a polymer of the phospholipid or its derivative instead of the phospholipid. Most generally speaking, the output increasing agent is an agent for improving the reaction rate on an electrode on which the enzyme and the electron mediator have been immobilized, permitting an attempt to increase output. Most generally speaking, the electron mediator diffusion promoter is an agent for increasing the diffusion coefficient of the electron mediator within an electrode on which the enzyme and the electron mediator have been immobilized or maintaining or increasing the concentration of the electron mediator near the electrode.

As a material for the positive electrode or the negative electrode, a general known material such as a carbon-based material can be used, or a porous conductive material including a skeleton composed of a porous material and a carbon-based material as a main component which coats at least a portion of the surface of the skeleton can be used. The porous conductive material can be obtained by coating at least a portion of the surface of a skeleton, which is composed of a porous material, with a material which contains a carbon-based material as a main component. The porous material constituting the skeleton of the porous conductive material may be basically any material regardless of the presence of conductivity as long as the skeleton can be stably maintained even with high porosity. As the porous material, a material having high porosity and high conductivity is preferably used. Examples of such a material having high porosity and high conductivity include metal materials (metals or alloys) and carbon-based materials with a strengthened skeleton (improved brittleness). When a metal material is used as the porous material, there are various possible alternatives because condition stability of the metal material varies with the operation environment conditions, such as the solution pH and potential. For example, a foamed metal or foamed alloy, such as nickel, copper, silver, gold, nickel-chromium alloy, stainless steel, or the like, is one of easily available materials. Besides the metal materials and carbon-based materials, resin materials (e.g., sponge-like) can be used as the porous material. The porosity and pore size (minimum pore size) of the porous material are determined according to the porosity and pore size required for the porous conductive material in consideration of the thickness of the material mainly composed of the carbon-based material and used for coating the surface of the skeleton composed of the porous material. The pore size of the porous material is generally 10 nm to 1 mm and typically 10 nm to 600 μm. On the other hand, the material used for coating the surface of the skeleton is required to have conductivity and stability at an estimated operation potential. As such a material, a material composed of a carbon-based material as a main component is used. The carbon-based material generally has a wide potential window and often has chemical stability. Examples of the material composed of the carbon-based material as a main component include materials composed of only a carbon-based material and materials composed of a carbon-based material as a main component and a small amount of sub-material selected according to the characteristics required for the porous conductive material. Examples of the latter materials include a material including a carbon-based material to which a high-conductivity material such as a metal is added for improving electric conductivity, and a material including a carbon-based material to which a polytetrafluoroethylene material is added to impart surface water repellency other than conductivity. Although there are various types of carbon-based materials, any carbon-based material may be used, and the carbon-based material may be elemental carbon or may contain an element other than carbon. In particular, the carbon-based material is preferably a fine powder carbon material having high conductivity and a high surface area. Examples of the carbon-based material include KB (Ketjenblack) imparted with high conductivity, and functional carbon materials such as carbon nanotubes, fullerene, and the like. As a method for coating with the material composed of the carbon-based material as a main component, any coating method may be used as long as the surface of the skeleton composed of the porous material can be coated using an appropriate binder according to demand. The pore size of the porous conductive material is selected so that the solution containing the substrate easily passes through the pores, and is generally 9 nm to 1 mm, more generally 1 μm to 1 mm, and most generally 1 to 600 μm. In a state in which at least a portion of the surface of the skeleton composed of the porous material is coated with the material composed of the carbon-based material as a main component, preferably, all pores communicate with one another or clogging does not occur due to the material composed of the carbon-based material as a main component.

The whole configuration of the fuel cell is selected according to demand, but for example, in a coin-like or button-like configuration, the fuel cell preferably has a structure in which the positive electrode, the electrolyte, and the negative electrode are accommodated in a space formed between a positive electrode current collector having a structure permeable to an oxidizer and a negative electrode current collector having a structure permeable to fuel. In this case, typically, the edge of one of the positive electrode current collector and the positive electrode current collector is caulked to the other of the positive electrode current collector and the positive electrode current collector through an insulating sealing member to form a space for accommodating the positive electrode, the electrolyte, and the negative electrode. However, the space is not limited to this, and the space may be formed by another processing method according to demand. The positive electrode current collector and the negative electrode current corrector are electrically insulated from each other through the insulating sealing member. As the insulating sealing member, typically, a gasket composed of an elastic material such as silicone rubber is used. However, the insulating sealing member is not limited to this. The planar shape of the positive electrode current collector and the negative electrode current corrector can be selected from, for example, a circular shape, an elliptic shape, a tetragonal shape, a hexagonal shape, and the like according to demand. Typically, the positive electrode current collector has one or a plurality of oxidizer supply ports, and the negative electrode current collector has one or a plurality of fuel supply ports. However, the configuration is not limited to this, and, for example, a material permeable to the oxidizer may be used for the positive electrode current collector instead of the formation of the oxidizer supply ports, and a material permeable to fuel may be used for the negative electrode current collector instead of the formation of the fuel supply ports. The negative electrode current collector typically includes a fuel storage portion. The fuel storage portion may be provided integrally with or detachably from the negative electrode current collector. The fuel storage portion typically has a closing cover. In this case, the fuel can be injected in the fuel storage portion by removing the cover. The fuel may be injected from the side of the fuel storage portion without using the closing cover. When the fuel storage portion is provided detachably from the negative electrode current collector, for example, a fuel tank or fuel cartridge filled with fuel may be provided as the fuel storage portion. The fuel tank or fuel cartridge may be disposable but is preferably a type in which fuel can be charged from the viewpoint of effective utilization of resources. The used fuel tank or fuel cartridge may be exchanged for a fuel tank or fuel cartridge filled with fuel. Further, for example, the fuel storage portion may be formed in a closed vessel having a fuel supply port and a fuel discharge port so that fuel is continuously supplied to the closed vessel from the outside through the supply port, thereby permitting continuous use of the fuel cell. Alternatively, the fuel cell may be used without using the fuel storage portion in a state in which the fuel cell floats on the fuel contained in an open fuel tank so that the negative electrode is on the lower side, and the positive electrode is on the upper side.

The fuel cell may have a structure in which the negative electrode, the electrolyte, the positive electrode, and the positive electrode current collector having a structure permeable to an oxidizer are provided in order around a predetermined central axis, and the negative electrode current collector having a structure permeable to fuel is provided to be electrically connected to the negative electrode. In the fuel cell, the negative electrode may have a cylindrical shape having a circular, elliptic, or polygonal sectional shape or a columnar shape having a circular, elliptic, or polygonal sectional shape. When the negative electrode has a cylindrical shape, for example, the negative electrode current collector may be provided on the inner periphery of the negative electrode, provided between the negative electrode and the electrolyte, provided on at least one end of the negative electrode, or provided at two positions or more of these. In addition, the negative electrode may be configured to hold the fuel. For example, the negative electrode may be made of a porous material so as to also serve as a fuel holding portion. Alternatively, a columnar fuel holding portion may be provided on a predetermined central axis. For example, when the negative electrode current collector is provided on the inner periphery of the negative electrode, the fuel holding portion may include the space around the negative electrode current collector or a vessel such as a fuel tank or a fuel cartridge provided in the space separately from the negative electrode current collector, and the vessel may be detachable or fixed. The fuel holding portion has a columnar shape, an elliptic cylindrical shape, or a polygonal cylindrical shape such as a quadratic or hexagonal cylindrical shape, but the shape is not limited to this. The electrolyte may be formed in a bag-like vessel so as to wrap all the negative electrode and the negative electrode current collector. In this case, when the fuel holding portion is fully charged with the fuel, the fuel can be brought in contact with the whole negative electrode. In the vessel, at least a portion sandwiched between the positive electrode and the negative electrode may be made of the electrolyte, and the other portion may be made of a material other than the electrolyte. Further, the fuel vessel may be formed in a closed vessel having a fuel supply port and a fuel discharge port so that fuel is continuously supplied to the closed vessel from the outside through the supply port, thereby permitting continuous use of the fuel cell. The negative electrode preferably has a high void ratio, for example a void ratio of 60% or more, in order to permit the negative electrode to store sufficient fuel therein.

A pellet electrode can be used as each of the positive electrode and the negative electrode. The pellet electrode can be formed by mixing in an agate mortar a carbon-based material (particularly preferably a fine power carbon material having high conductivity and high surface area), specifically KB (Ketjenblack) imparted with high conductivity or a functional carbon material such as carbon nanotubes, fullerene, or the like, a binder, e.g., poly(vinylidene fluoride), according to demand, the enzyme powder (or the enzyme solution), the coenzyme powder (or the coenzyme solution), the electron mediator powder (or the electron mediator solution), and the immobilization polymer powder (or the polymer solution), appropriately drying the mixture, and then pressing the mixture into a predetermined shape. The thickness (electrode thickness) of the pellet electrode is determined according to demand, but is, for example, about 50 μm. For example, when the coin-shaped fuel cell is manufactured, the pellet electrode can be formed by pressing the above-described materials for forming the pellet electrode into a circular shape (the diameter of the circular shape is, for example, 15 mm, but is not limited to this and determined according to demand) using a tablet machine. When the pellet electrode is formed, the electrode thickness is adjusted to a desired value by, for example, controlling the amount of carbon contained in the materials for forming the pellet electrode and the pressing pressure. When the positive or negative electrode is inserted into a coin-like cell can, electric contact between the positive or negative electrodes and the cell can is preferably achieved by, for example, inserting a metal mesh spacer between the positive or negative electrode and the cell can.

As the method for forming the pellet electrode, besides the above-described method, for example, a mixed solution (an aqueous or organic solvent mixed solution) of the carbon-based material, the binder according to demand, and the enzyme immobilization components (the enzyme, coenzyme, electron mediator, polymer, and the like) may be appropriately applied on a current collector and dried, and the whole may be pressed and then cut into a desired electrode size.

The fuel cell can be used for almost all applications requiring electric power regardless of size. For example, the fuel cell can be used for electronic apparatuses, movable bodies (an automobile, a bicycle, an aircraft, a rocket, and a spacecraft), power plants, construction machines, machine tools, power generating systems, and co-generation systems. The output, size, shape, and fuel type are determined according to applications.

A second embodiment relates to an electronic apparatus including one or a plurality of fuel cells, where at least one fuel cell has a structure in which positive and negative electrodes are opposed to each other with an electrolyte containing a buffer material provided therebetween, an enzyme being immobilized on at least one of the positive and negative electrodes, and the buffer material contains a compound containing an imidazole ring.

The electronic apparatus may be any type and includes a portable type and a stationary type. Examples of the electronic apparatus include cellular phones, mobile devices, robots, personal computers, game equipment, automobile-installed equipment, home electric appliances, and industrial products.

The matters described with respect to the first embodiment apply to the second embodiment.

A third embodiment relates to a fuel cell including a structure in which positive and negative electrodes are opposed to each other with an electrolyte containing a buffer material provided therebetween, an enzyme being immobilized on at least one of the positive and negative electrodes, the fuel cell being characterized in that the buffer material contains at least one selected from the group consisting of 2-aminoethanol, triethanolamine, TES, and BES.

Herein, TES is N-tris(hydroxymethyl)methyl-2-aminoethanesulfonic acid, and BES is N,N-bis(2-hydroxyethyl)-2-aminoethanesulfonic acid.

In the third embodiment, the buffer material contains a compound including an imidazole ring or another buffer material.

The matters described with respect to the first and second embodiments apply to the third embodiments as long as they are not adverse to the properties. Also, the same advantages as in the first embodiments can be achieved.

In the embodiments configured as described above, the buffer material contained in the electrolyte contains a compound having an imidazole ring or at least one selected from the group consisting of 2-aminoethanol, triethanolamine, TES, and BES, and thus even when the proton amount varies in an electrode or in an enzyme-immobilized membrane by enzymatic reaction through proton during a high-output operation of the fuel cell, a sufficient buffer function can be achieved, and deviation of pH of the electrolyte around the enzyme from optimum pH can be sufficiently suppressed. Therefore, an electrode reaction of the enzyme, the coenzyme, the electron mediator, and the like can be efficiently steadily effected.

According to the present embodiment, it is possible to achieve a sufficient buffer ability even in a high-output operation, sufficiently exhibit the original ability of an enzyme, and thus obtain a fuel cell having excellent performance. In addition, a high-performance electronic apparatus and the like can be realized using the excellent fuel cell.

Additional features and advantages are described herein, and will be apparent from, the following Detailed Description and the figures.

BRIEF DESCRIPTION OF THE FIGURES

FIG. 15 is a schematic drawing showing a specific example of the configuration of the biofuel cell according to the first embodiment.

FIG. 21 is a top view, a sectional view, and a back view showing a biofuel cell according to a third embodiment.

FIG. 30 is a schematic drawing and a sectional view for illustrating a structure of a porous conductive material used for an electrode material of a negative electrode in a biofuel cell according to a sixth embodiment.

FIG. 31 is a schematic drawing for illustrating a method for producing a porous conductive material used for an electrode material of a negative electrode in the biofuel cell according to the sixth embodiment.

DETAILED DESCRIPTION

Embodiments will be described with reference to the drawings.

Figure 1:
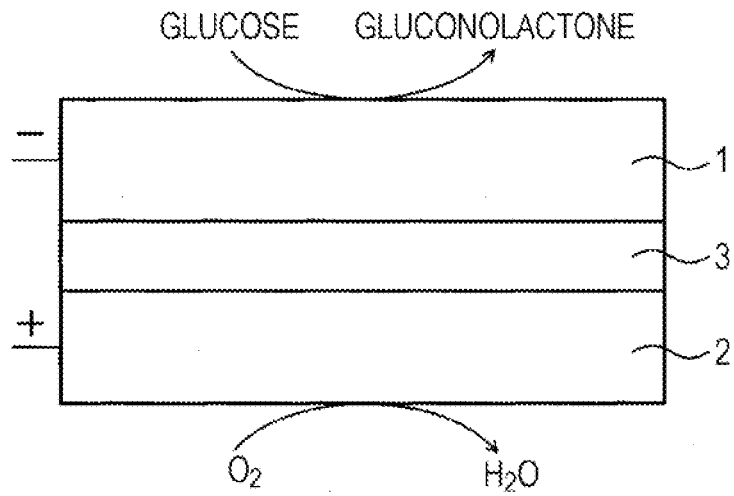
FIG. 1 is a schematic drawing showing a biofuel cell according to a first embodiment.
Figure 2:
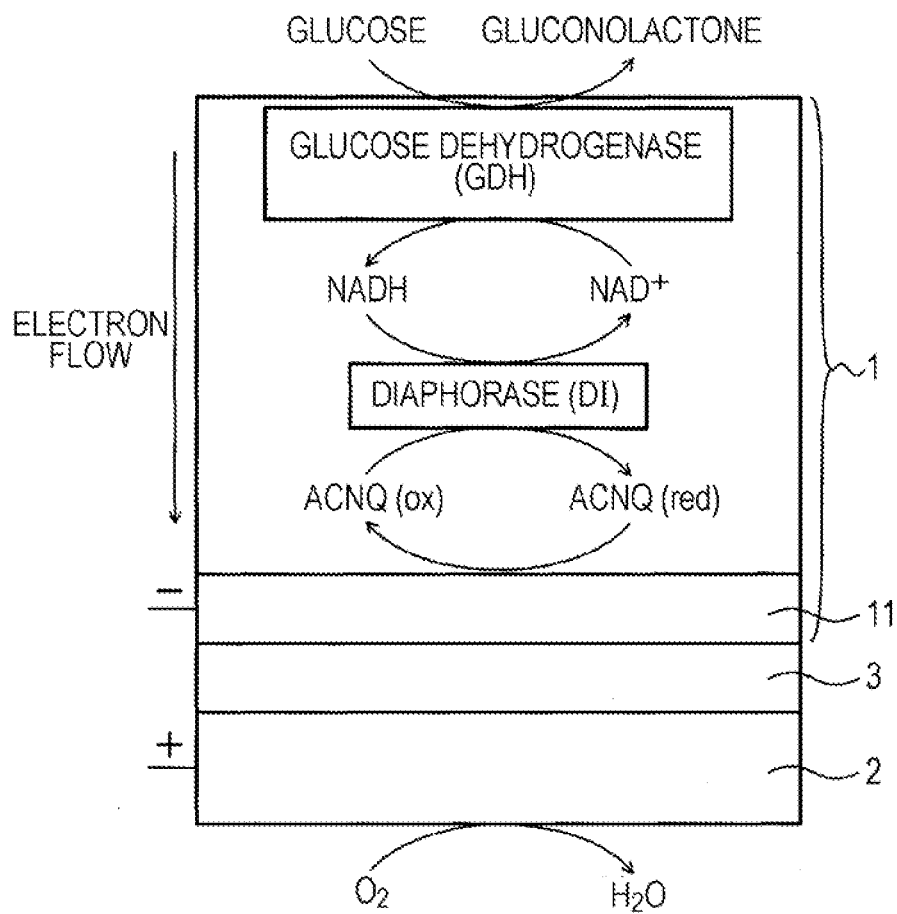
FIG. 2 is a schematic drawing showing the detail configuration of a negative electrode, an example of an enzyme group immobilized on the negative electrode, and electron transfer reaction of the enzyme group in the biofuel cell according to the first embodiment.

FIG. 1 schematically shows a biofuel cell according to a first embodiment. In this biofuel cell, glucose is used as fuel. FIG. 2 schematically shows the detail configuration of a negative electrode, an example of an enzyme group immobilized on the negative electrode, and electron transfer reaction of the enzyme group in the biofuel cell.

As shown in FIG. 1, the biofuel cell has a structure in which a negative electrode 1 and a positive electrode 2 are opposed to each other with an electrolyte layer 3 provided therebetween which conducts only protons. On the negative electrode 1, the glucose supplied is decomposed with an enzyme to take out electrons and produce protons ($H^+$). On the positive electrode 2, water is produced from protons transferred from the negative electrode 1 through the electrolyte layer 3, the electrons transferred from the negative electrode 1 through an external circuit, and oxygen, for example, air oxygen.

The negative electrode 1 has a configuration in which on an electrode 11 (refer to FIG. 2) composed of, for example, porous carbon, an enzyme involved in decomposition of glucose, a coenzyme (e.g., $NAD^+$, $NADP^+$, or the like) producing a reduced form in association with an oxidation reaction in the glucose decomposition process, a coenzyme oxidase (e.g., diaphorase) which oxidizes the reduced form of the coenzyme (e.g., NADH, NADPH, or the like), and an electron mediator which receives, from the coenzyme oxidase, electrons produced in association with oxidation of the coenzyme and supplies the electrons to the electrode 11 are immobilized by an immobilization material composed of, for example, a polymer.

As the enzyme involved in decomposition of glucose, for example, glucose dehydrogenase (GDH) can be used. When this oxidase is present, for example, β-D-glucose can be oxidized into D-glucono-δ-lactone.

Further, the D-glucono-δ-lactone can be decomposed into 2-keto-6-phospho-D-gluconate by the presence of two enzymes, i.e., gluconokinase and phosphogluconate dehydrogenase (PhGDH). In other words, the D-glucono-δ-lactone is converted into D-gluconate by hydrolysis, and the D-gluconate is phosphorylated to 6-phospho-D-gluconate by hydrolysis of adenosine triphosphate (ATP) into adenosine diphosphate (ADP) and phosphoric acid in the presence of gluconokinase. The 6-phospho-D-gluconate is oxidized into 2-keto-6-phospho-D-gluconate by the action of the oxidase PhGDH.

The glucose can be decomposed into $CO_2$ by utilizing glucose metabolism other than the above-described decomposition process. The decomposition process utilizing glucose metabolism is roughly divided into glucose decomposition by a glycolytic system, production of pyruvic acid, and a TCA cycle, which are widespread reaction systems.

The oxidation reaction in the decomposition process of a monosaccharide proceeds in association with a reduction reaction of a coenzyme. The coenzyme is substantially determined according to the enzyme acting, and in the case of GDH, $NAD^+$ is used as the coenzyme. Namely, when β-D-glucose is oxidized into D-glucono-δ-lactone by the action of GDH, $NAD^+$ is reduced into NADH, producing $H^+$.

The produced NADH is immediately oxidized into $NAD^+$ in the presence of diaphorase (DI), producing two electrons and $H^+$. Therefore, two electrons and two $H^+$ are produced in one step of oxidation reaction per molecule of glucose, and four electrons and four $H^+$ in total are produced in two steps of oxidation reaction.

The electrons produced in the above-mentioned process are transferred to the electrode 11 from diaphorase through the electron mediator, and $H^+$ are transferred to the positive electrode 2 through the electrolyte layer 3.

The electron mediator receives and transfers electrons from and to the electrode 11, and the output voltage of the fuel cell depends on the oxidation-reduction potential of the electron mediator. In other words, in order to obtain a higher output voltage, the electron mediator with a more negative potential is preferably selected for the negative electrode 1. However, it is necessary to consider the reaction affinity of the electron mediator for the enzyme, the rate of electron exchange to the electrode 11, the structural stability to inhibitors (light, oxygen, and the like), and the like. From this viewpoint, as the electron mediator used for the negative electrode 1,2-amino-3-carboxy-1,4-naphthoquinone (ACNQ) or vitamin K3 is preferably used. Examples of other usable electron mediators include compounds having a quinone skeleton, metal complexes of osmium (Os), ruthenium (Ru), iron (Fe), and cobalt (Co), viologen compounds such as benzylviologen, compounds having a nicotinamide structure, compounds having a riboflavin structure, compounds having a nucleotide phosphate structure, and the like.

The electrolyte layer 3 is a proton conductor adapted for transferring $H^+$ produced on the negative electrode 1 to the positive electrode 2 and is composed of a material which has no electron conductivity and is capable of transferring $H^+$. As the electrolyte layer 3, for example, a material appropriately selected from the above-described examples can be used. In this case, the electrolyte layer 3 contains a buffer solution containing a compound having an imidazole ring as a buffer material. The compound having an imidazole ring can be appropriately selected from the above-described compounds, for example, imidazole. The concentration of the compound having an imidazole ring as the buffer material is selected according to demand but can be preferably 0.2 M to 3 M. In this case, the high buffer ability can be achieved, and the original ability of the enzyme can be sufficiently exhibited even in a high-output operation of the fuel cell. Further, excessively high or low ionic strength adversely affects the enzyme activity, but the ionic strength is preferably proper ionic strength, for example, about 0.3, in view of electrochemical response. However, there are optimum values of pH and ionic strength for the enzyme used, and the pH and ionic strength are not limited to the above-described values.

The enzyme, the coenzyme, and the electron mediator are preferably immobilized on the electrode 11 with an immobilization material in order to efficiently capture as an electrical signal an enzyme reaction phenomenon taking place near the electrode. Further, the enzyme reaction system on the negative electrode 1 can be stabilized by immobilizing the enzyme which decomposes fuel and the coenzyme on the electrode 11. Examples of such an immobilization material include a combination of glutaraldehyde (GA) and poly-L-lysine (PLL) and a combination of sodium polyacrylate (PAAcNa) and poly-L-lysine (PLL). These may be used alone or another polymer may be further used. When a combination of glutaraldehyde and poly-L-lysine is used as the immobilization material, the enzyme immobilizing ability possessed by each material can be greatly improved, thereby achieving the excellent enzyme immobilizing ability of the immobilizing material as a whole. In this case, the optimum composition ratio between glutaraldehyde and poly-L-lysine varies depending on the enzyme to be immobilized and the substrate of the enzyme, but may be generally a desired value. For example, when an aqueous solution of glutaraldehyde (0.125%) and an aqueous solution of poly-L-lysine (1%) are used, the ratio may be 1:1, 1:2, or 2:1.

FIG. 2 shows as an example the case in which the enzyme involved in glucose decomposition is glucose dehydrogenase (GDH), the coenzyme which produces a reduced form in association with an oxidation reaction in the glucose decomposition process is $NAD^+$, the coenzyme oxidase which oxidizes the reduced form NADH of the coenzyme is diaphorase (DI), and the electron mediator which receives, from the coenzyme oxidase, electrons produced in association with oxidation of the coenzyme and supplies the electrons to the electrode 11 is ACNQ.

On the positive electrode 2, the oxygen-reductase and the electron mediator which receives and supplies electrons from and to an electrode are immobilized on an electrode composed of, for example, porous carbon. As the oxygen-reductase, for example, bilirubin oxidase (BOD), laccase, ascorbate oxidase, or the like can be used. As the electron mediator, for example, hexacyanoferrate ion produced by dissociation of potassium hexacyanoferrate can be used. The electron mediator is preferably immobilized at a sufficiently high concentration, for example, $0.64 \times 10^{-6}$ mol/mm$^2$ or more in average.

On the positive electrode 2, oxygen in air is reduced with $H^+$ from the electrolyte layer 3 and electrons from the negative electrode 1 in the presence of the oxygen-reductase to produce water.

In the fuel cell configured as described above, when glucose is supplied to the negative electrode 1 side, the glucose is decomposed with the catabolic enzyme containing the oxydase. Since the oxydase is involved in the decomposition process of the monosaccharide, electrons and $H^+$ can be produced on the negative electrode 1 side, and a current can be generated between the negative electrode 1 and the positive electrode 2.

Figure 3:
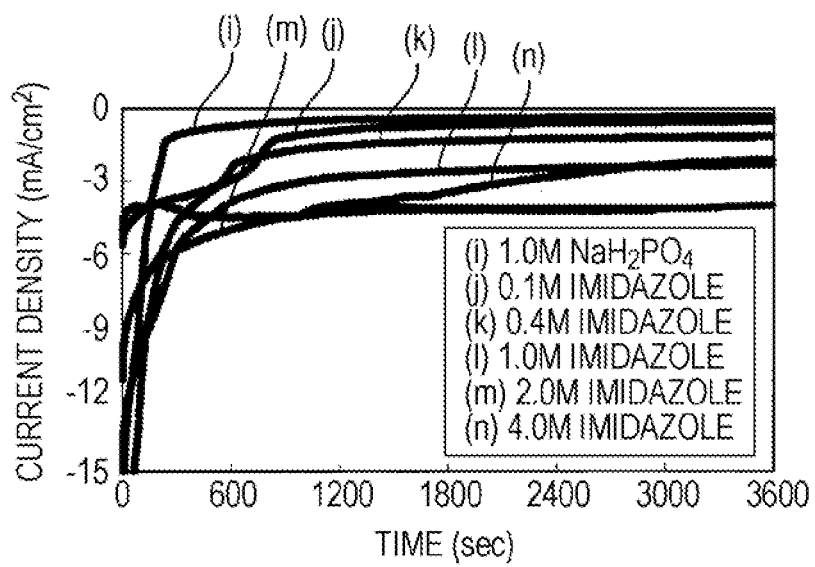
FIG. 3 is a schematic diagram showing the results of chronoamperometry performed for evaluating the biofuel cell according to the first embodiment.
Figure 4:
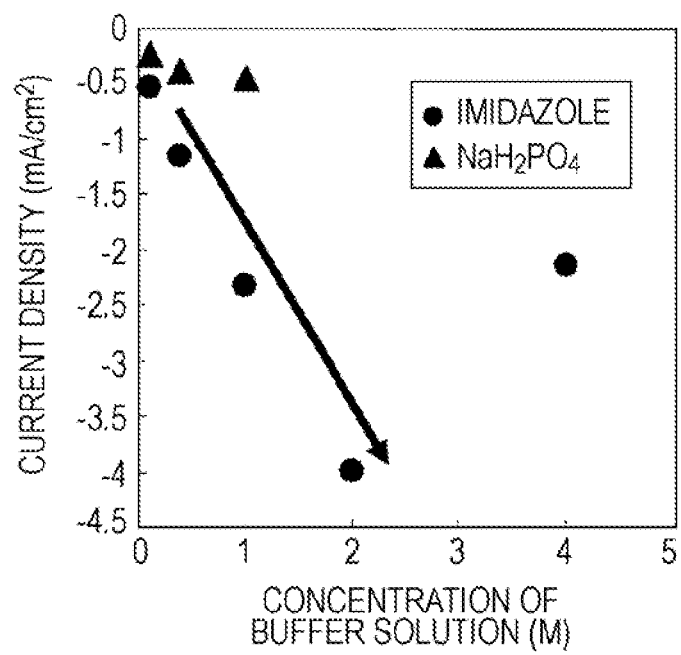
FIG. 4 is a schematic diagram showing a relationship between the buffer solution concentration and the current density obtained from the results of chronoamperometry performed for evaluating the biofuel cell according to the first embodiment.
Figure 5:
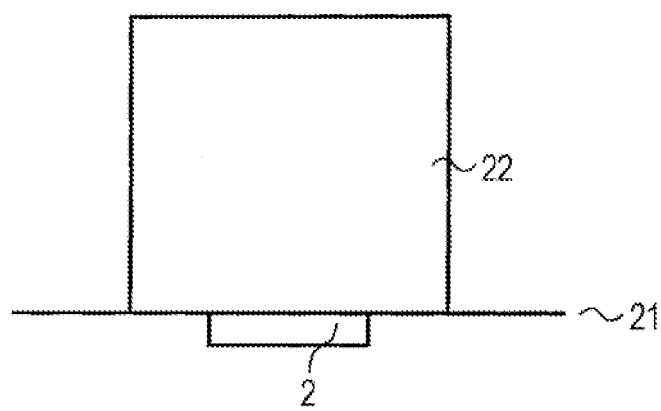
FIG. 5 is a schematic drawing showing a measurement system used for measuring chronoamperometry shown in FIG. 3.

Next, description is made of the effect of maintaining and improving the current value when BOD was immobilized as the oxygen-reductase on the positive electrode 2 and a mixture of imidazole and hydrochloric acid, which was adjusted to pH 7, was used as the buffer solution. Table 1 and FIG. 3 show the results of chronoamperometry measured at various imidazole concentrations. Also, FIG. 4 shows the dependency of the current value (the value of current density 3600 seconds after shown in Table 1 and FIG. 3) on the buffer solution concentration (the concentration of the buffer material in the buffer solution). Table 1 and FIGS. 3 and 4 also show the results when a 1.0 M $NaH_2PO_4$/NaOH buffer solution was used as the buffer solution for comparison. The measurement was performed in the state in which film-formed cellophane 21 was placed on the positive electrode 2, and the buffer solution 22 was put into contact with the cellophane 21 as shown in FIG. 5. As the positive electrode 2, an enzyme/electron mediator-immobilized electrode formed as described below was used. First, commercial carbon felt (manufactured by TORAY, B0050) was used as porous carbon and cut into a 1-cm square. Next, 80 µl of hexacyanoferrate ion (100 mM), 80 µl of poly-L-lysine (1 wt %), and 80 µl (50 mg/ml) of a BOD solution were penetrated in order into the carbon felt, and then dried to form an enzyme/electron mediator immobilized electrode. Two of the enzyme/electron mediator immobilized electrodes produced as described above were stacked to form the positive electrode 2.

TABLE 1

| | Current density (mA/cm$^2$) | | | | | |
|---|---|---|---|---|---|---|
| | 1 sec | 180 sec | 300 sec | 600 sec | 1800 sec | 3600 sec |
| 1.0M NaH$_2$PO$_4$ | −17.22 | −3.11 | −1.10 | −0.73 | −0.41 | −0.34 |
| 0.1M imidazole | −5.64 | −3.98 | −3.71 | −2.98 | −0.70 | −0.54 |
| 0.4M imidazole | −11.18 | −6.37 | −4.69 | −2.48 | −1.35 | −1.16 |
| 1.0M imidazole | −15.59 | −8.44 | −5.81 | −3.86 | −2.60 | −2.32 |
| 2.0M imidazole | −25.10 | −7.39 | −5.88 | −5.01 | −4.20 | −3.99 |
| 4.0M imidazole | −5.08 | −3.90 | −4.19 | −4.53 | −3.47 | −2.13 |

As can be seen from Table 1 and FIG. 3, at the $NaH_2PO_4$ concentration of 1.0 M, an initial current can be obtained, but the current significantly decreases 3600 seconds after. In contrast, particularly at the imidazole concentration of 0.4 M, 1.0 M, and 2.0 M, substantially no decrease in the current is observed 3600 seconds after. As seen from FIG. 4, within the imidazole concentration range of 0.2 to 2.5 M, the current value linearly increases with the concentration. In addition, although the $NaH_2PO_4$/NaOH buffer solution and the imidazole/hydrochloric acid buffer solution have a $pK_a$ of about 7 and substantially the same oxygen solubility, when imidazole is present in the buffer solution at the same concentration, a large oxygen-reduction current is obtained.

Figure 6:
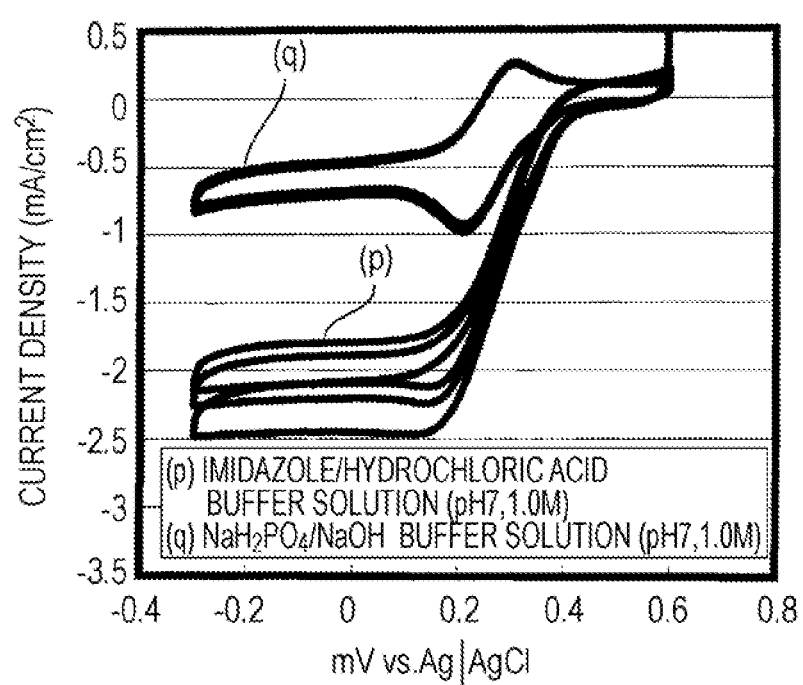
FIG. 6 is a schematic diagram showing the results of cyclic voltammetry performed for evaluating the biofuel cell according to the first embodiment.
Figure 7:
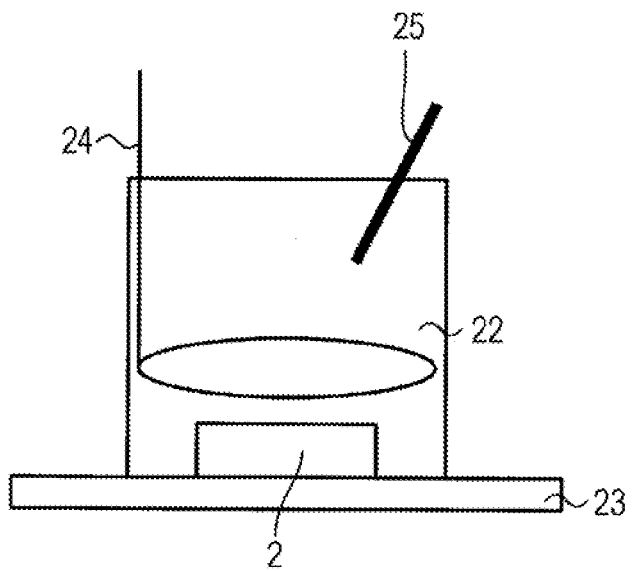
FIG. 7 is a schematic drawing showing a measurement system used for measuring cyclic voltammetry shown in FIG. 6.

After chronoamperometry was performed for 3600 seconds as described above, cyclic voltammetry (CV) was performed between potentials of −0.3 V and +0.6 V. The results are shown in FIG. 6. However, this measurement was performed in the state in which a positive electrode 2 including the same enzyme/electron mediator immobilized electrode as described above was used as a working electrode and placed on an air-permeable PTFE (polytetrafluoroethylene) membrane 23, and a buffer solution 22 was put into contact with the positive electrode 2. A counter electrode 24 and a reference electrode 25 were immersed in the buffer solution 22, and an electrochemical measurement apparatus (not shown) was connected to the positive electrode 2 serving as the working electrode, the counter electrode 24, and the reference electrode 25. A Pt wire was used as the counter electrode 24, and Ag|AgCl was used as the reference electrode 25. The measurement was performed under atmospheric pressure, and the measurement temperature was 25° C. As the buffer solution 22, two types, i.e., an imidazole/hydrochloric acid buffer solution (pH 7, 1.0 M) and a $NaH_2PO_4$/NaOH buffer solution (pH 7, 1.0 M), were used.

FIG. 6 indicates that when the imidazole/hydrochloric acid buffer solution (pH 7, 1.0 M) is used as the buffer solution 22, extremely good CV characteristics are obtained.

It was confirmed from the above results that even if the measurement system is changed, the imidazole buffer solution has superiority.

Figure 8:
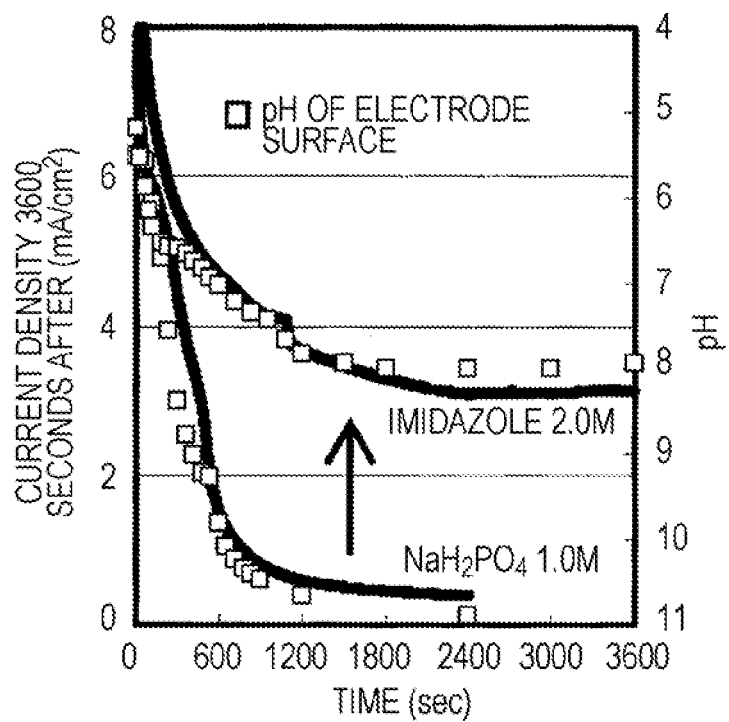
FIG. 8 is a schematic diagram showing the results of chronoamperometry performed using a buffer solution containing imidazole and a $NaH_2PO_4$ buffer solution in the biofuel cell according to the first embodiment.

FIG. 8 shows the results of chronoamperometry performed by the same method as described above using a positive electrode 2 on which BOD was immobilized, a 2.0 M imidazole/hydrochloric acid buffer solution, and a 1.0 M $NaH_2PO_4$/NaOH buffer solution, together with the measurement results of pH on the electrode surface. However, the imidazole/hydrochloric acid buffer solution had a $pK_a$ of 6.95, a conductivity of 52.4 mS/cm, an oxygen solubility of 0.25 mM, and a pH of 7, and the $NaH_2PO_4$/NaOH buffer solution had a $pK_a$ of 6.82 ($H_2PO_4^-$), a conductivity of 51.2 mS/cm, an oxygen solubility of 0.25 mM, and a pH of 7. As seen from FIG. 8, when the 2.0 M imidazole/hydrochloric acid buffer solution was used, a current density of as high as about 15 times that in use of the 1.0 M $NaH_2PO_4$/NaOH buffer solution is obtained. Also, FIG. 8 indicates that changes in the current are substantially equal to pH changes on the electrode surface. The reason why these results are obtained is described with reference to FIGS. 9 and 10.

Figure 9:
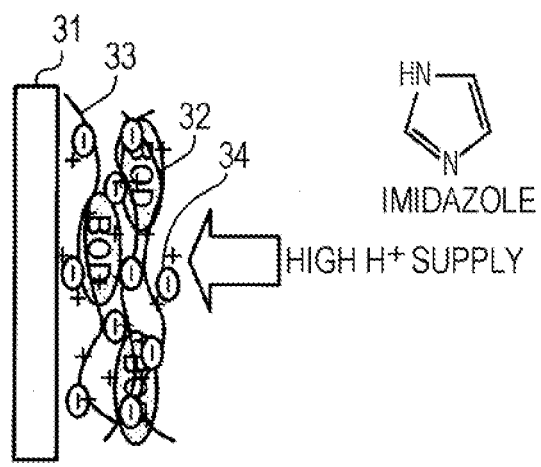
FIG. 9 is a schematic diagram for illustrating a mechanism in which a large current can be steadily obtained when a buffer solution containing imidazole is used in the biofuel cell according to the first embodiment.
Figure 10:
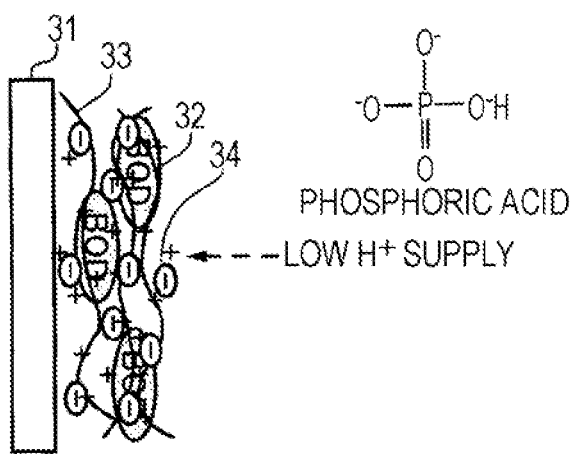
FIG. 10 is a schematic diagram for illustrating a mechanism in which a current is decreased when a $NaH_2PO_4$ buffer solution is used in the biofuel cell according to the first embodiment.

FIGS. 9 and 10 show the state of immobilization of BOD 32 together with an electron mediator 34 on an electrode 31 with a immobilization material 33 such as polyion complex. As shown in FIG. 9, when a 2.0 M imidazole/hydrochloric acid buffer solution is used, it is thought that a sufficiently large amount of protons ($H^+$) is supplied to achieve the high buffer ability, and pH is stabilized, thereby steadily achieving a high current density. In contrast, as shown in FIG. 10, when a 1.0 M $NaH_2PO_4$/NaOH buffer solution is used, it is thought that the buffer ability is insufficient because of a small amount of $H^+$ supplied, and thus pH is significantly increased, thereby decreasing the current density.

Figure 11:
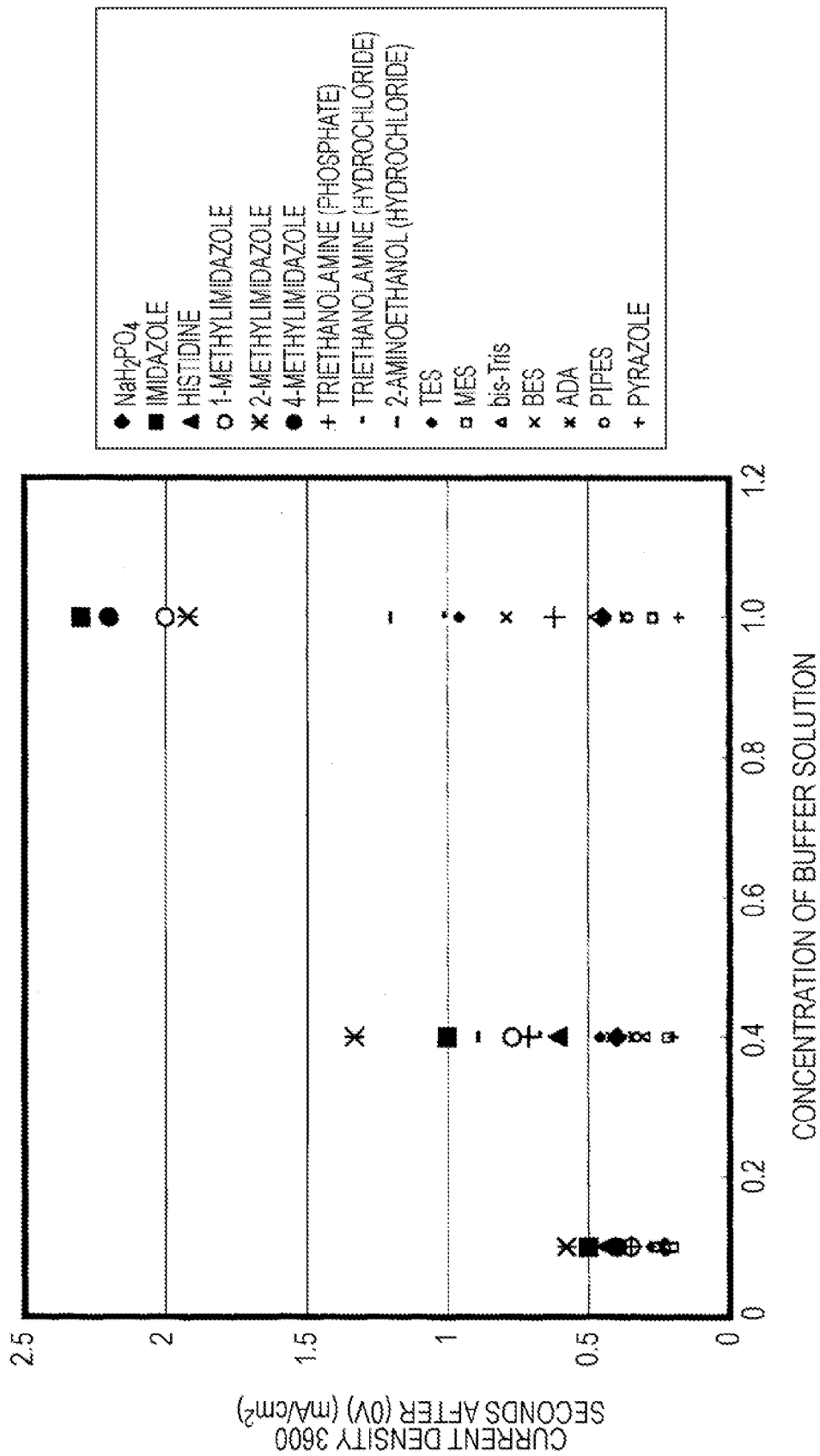
FIG. 11 is a schematic diagram showing a relationship between the buffer solution concentration and current density when various buffer solutions are used in the biofuel cell according to the first embodiment.
Figure 12:
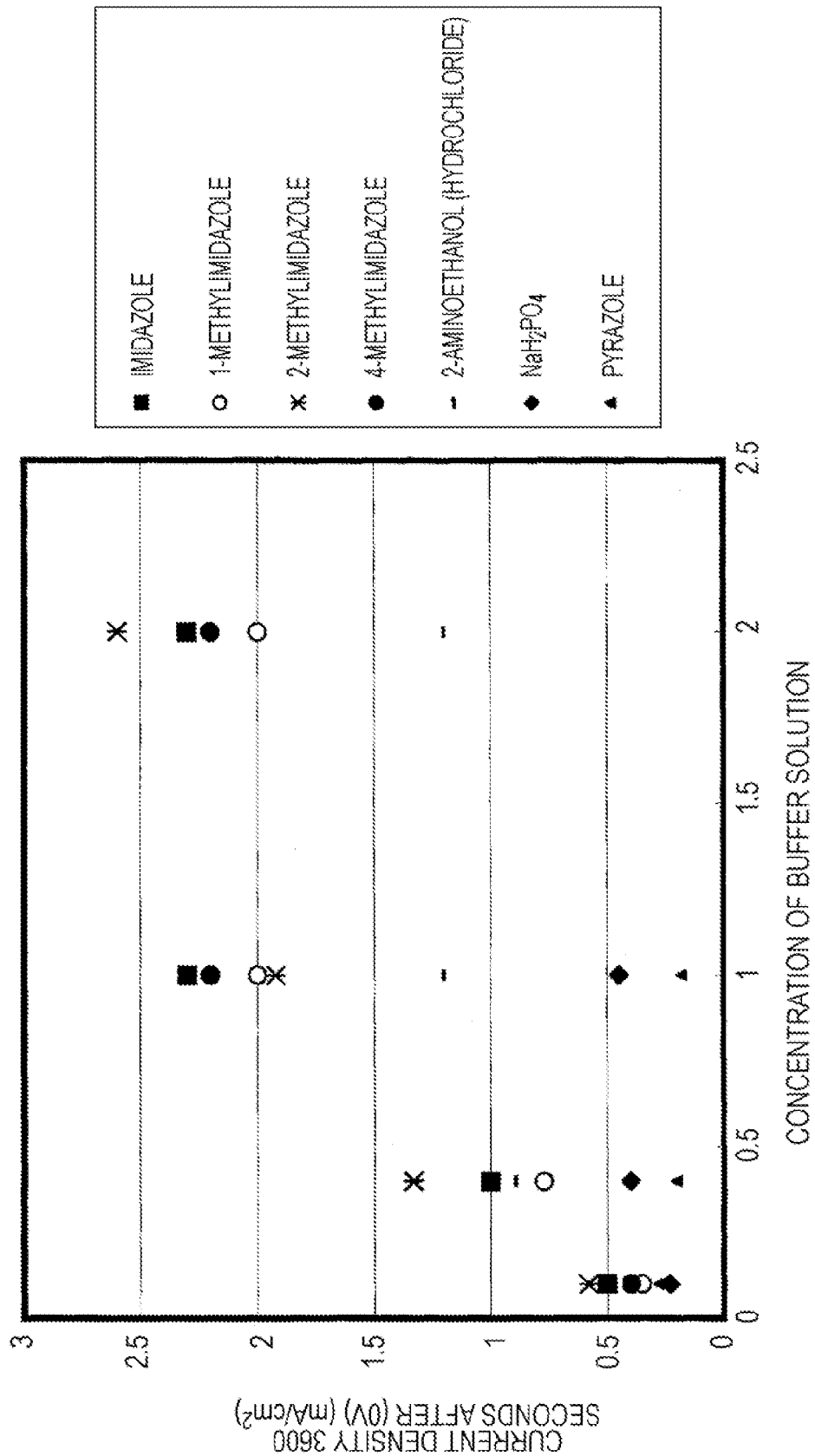
FIG. 12 is a schematic diagram showing a relationship between the buffer solution concentration and current density when various buffer solutions are used in the biofuel cell according to the first embodiment.

FIGS. 11 and 12 show changes in the current density 3600 seconds (1 hour) after with the buffer solution concentration when various buffer solutions were used. As seen from FIGS. 11 and 12, when a buffer solution containing a compound having an imidazole ring is used, a high current density is obtained as a whole as compared with other buffer solutions such as a buffer solution containing $NaH_2PO_4$, and in particular, this tendency becomes significant as the buffer solution concentration increases. Also, FIGS. 11 and 12 indicate that when a buffer solution containing as a buffer material 2-aminoethanol, triethanolamine, TES, or BES is used, a high current density is obtained, and in particular, this tendency becomes significant as the buffer solution concentration increases.

Figure 13:
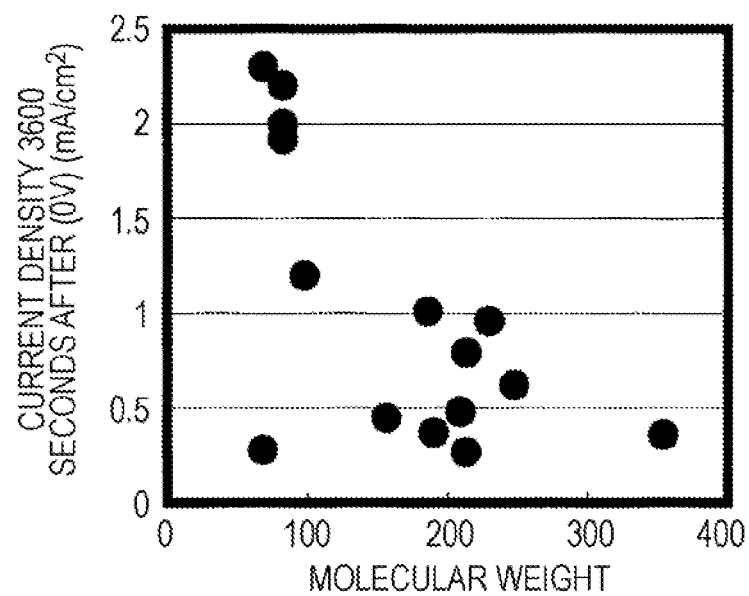
FIG. 13 is a schematic diagram showing a relationship between the molecular weight of a buffer material of a buffer solution and current density when various buffer solutions are used in the biofuel cell according to the first embodiment.
Figure 14:
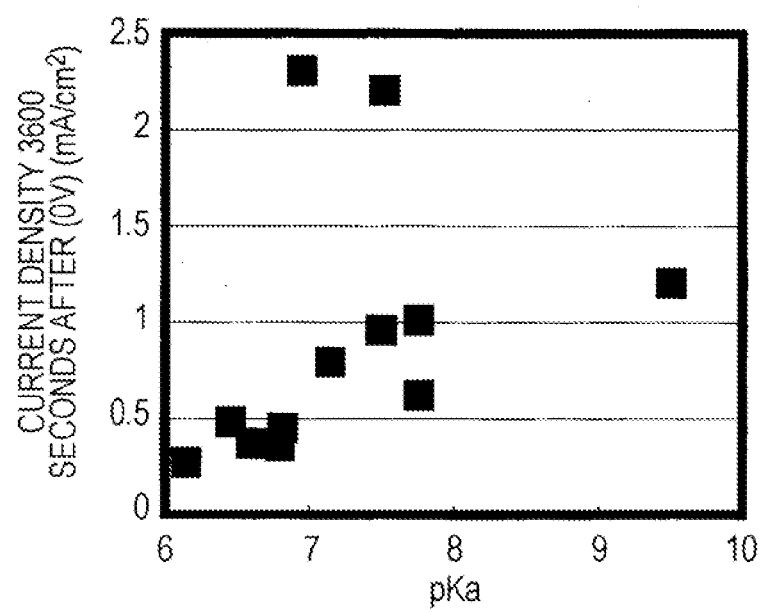
FIG. 14 is a schematic diagram showing a relationship between plc, of a buffer solution and current density when various buffer solutions are used in the biofuel cell according to the first embodiment.

FIGS. 13 and 14 show plots of the current density 3600 seconds after in use of the buffer solutions shown in FIGS. 11 and 12 against the molecular weights and $pK_a$ of the buffer materials.

A specific example of the configuration of the biofuel cell is shown in FIGS. 15A and 15B.

As shown in FIGS. 15A and 15B, the biofuel cell has a configuration in which a negative electrode 1 composed of an enzyme/electron mediator immobilized carbon electrode including the above-describe enzyme and electron mediator immobilized on a 1-cm$^2$ carbon felt with an immobilization material and a positive electrode 2 composed of an enzyme/electron mediator immobilized carbon electrode including an enzyme and an electron mediator immobilized on a 1 cm$^2$ carbon felt with an immobilization material are opposed to each other through an electrolyte layer 3 containing as a buffer material a compound having an imidazole ring or 2-aminoethanol hydrochloride. In this case, Ti current collectors 41 and 42 are disposed below the positive electrode 2 and above the negative electrode 1, respectively, so that a current can be easily collected. Reference numerals 43 and 44 each denote a fixing plate. The fixing plates 43 and 44 are fastened together with screws 45 so that the positive electrode 2, the negative electrode 1, the electrolyte layer 3, and the Ti current collectors 41 and 42 are sandwiched between the fixing plates 43 and 44. In addition, a circular recess 43a for air intake is provided on one (outer side) of the surfaces of the fixing plate 43, and many holes 43b are provided at the bottom of the recess 43a so as to pass to the other surface. These holes 43b serve as air supply passages to the positive electrode 2. On the other hand, a circular recess 44a for fuel charge is provided on one (outer side) of the surfaces of the fixing plate 44, and many holes 44b are provided at the bottom of the recess 44a so as to pass to the other surface. These holes 44b serve as fuel supply passages to the negative electrode 1. Further, a spacer 46 is provided on the periphery of the other surface of the fixing plate 44 so that the fixing plates 43 and 44 are fastened together by the screws 45 with a predetermined space therebetween.

Figure 16:
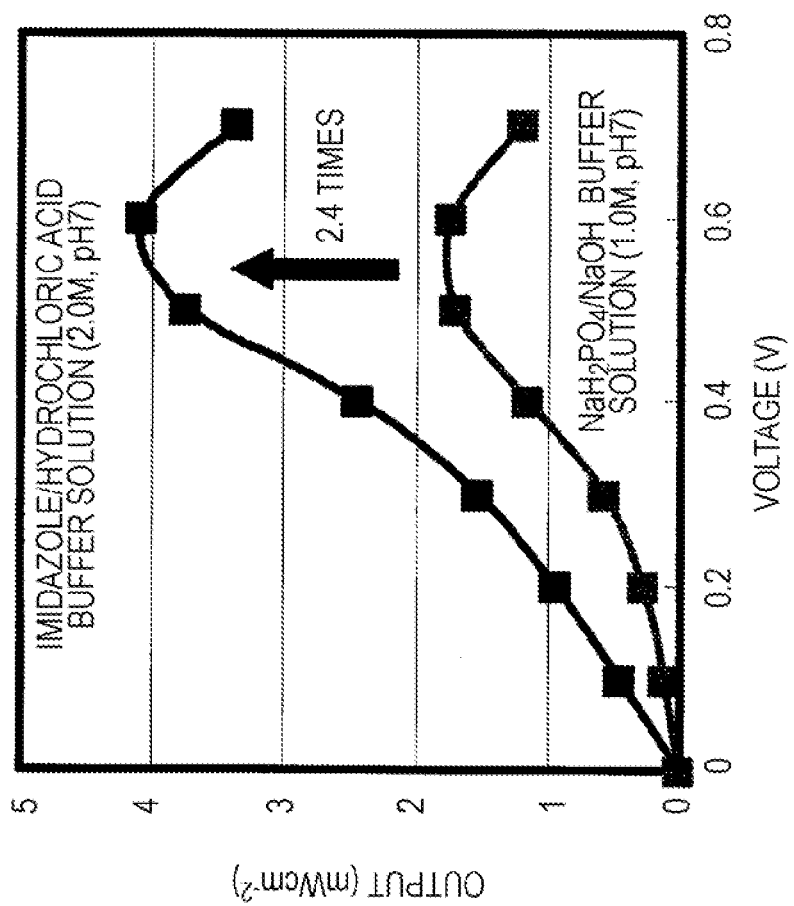
FIG. 16 is a schematic diagram showing the results of measurement of output of the biofuel cell used for evaluation according to the first embodiment.

As shown in FIG. 15B, a load 47 was connected between the Ti current collectors 41 and 42, and a glucose/buffer solution is placed as fuel in the recess 44a of the fixing plate 44, for electric power generation. As the buffer solution, two types, i.e., a 2.0 M imidazole/hydrochloric acid buffer solution (pH 7) and a 1.0 M $NaH_2PO_4$/NaOH buffer solution (pH 7), were used. The glucose concentration was 0.4 M. The operation temperature was 25° C. FIG. 16 shows output characteristics. As shown in FIG. 16, when the 2.0 M imidazole/hydrochloric acid buffer solution was used as the buffer solution, the output (electric power density) is about 2.4 times as large as that in the case in which the $NaH_2PO_4$/NaOH buffer solution was used.

As described above, according to the first embodiment, the electrolyte layer 3 contains as the buffer material a compound having an imidazole ring, and thus a sufficient buffer ability can be achieved. Therefore, even when the proton amount varies in a proton electrode or in an enzyme-immobilized membrane by enzymatic reaction through proton during a high-output operation of the biofuel cell, a sufficient buffer function can be achieved, and deviation of pH of the electrolyte around the enzyme from optimum pH can be sufficiently suppressed. Therefore, the original ability of the enzyme can be sufficiently exhibited, and an electrode reaction of the enzyme, the coenzyme, the electron mediator, and the like can be efficiently steadily effected. Consequently, a high-performance biofuel cell capable of high-output operation can be realized. The biofuel cell is preferably applied to power supplies for various electronic apparatuses, mobile bodies, power generating systems, and the like.

Next, a biofuel cell according to a second embodiment of the present invention is described.

In the biofuel cell, an electrolyte layer 3 has charge with the same sign as that of charge of an oxidized or reduced form of an electron mediator used on a positive electrode 2 and a negative electrode 1. For example, the surface of the electrolyte layer 3 on at least the positive electrode 2 side is negatively charged and has negative charge. Specifically, for example, the whole or part of at least the positive electrode 2 side-portion of the electrolyte layer 3 contains polyanion having negative charge. As the polyanion, preferably, Nafion (trade name, US DuPont) which is an ion exchange resin containing fluorine-containing carbon sulfonic acid groups is used.

Here, description is made of the results of a comparative experiment carried out for proving that when the electrolyte layer 3 has charge with the same sign as that of charge of an oxidized or reduced form of the electron mediator, an oxidized or reduced form of the electron mediator can be prevented from permeating through the electrolyte layer 3.

Figure 17:
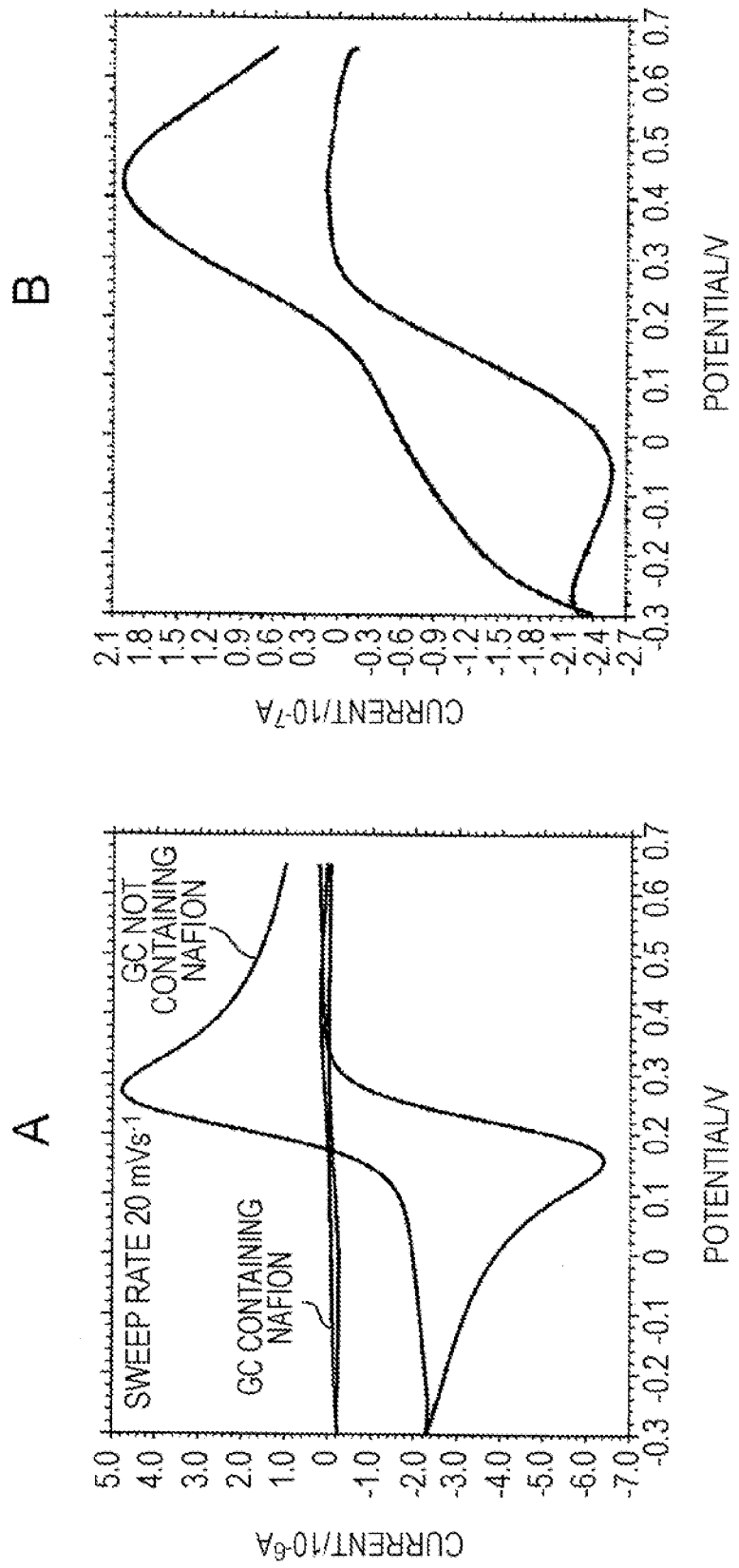
FIG. 17 is a schematic diagram showing the results of cyclic voltammetry performed for proving the effect of preventing permeation of an electron mediator in a biofuel cell according to a second embodiment.

First, two commercial glassy carbon (GC) electrodes (diameter 3 mm) were prepared and both polished and washed. Next, 5 μl of an emulsion (20%) of commercial Nafion as polyanion was added to one of the glassy carbon electrodes and dried. Next, the two glassy carbon electrodes were immersed in a 1 mM hexacyanoferrate ion (polyvalent anion) aqueous solution (50 mM $NaH_2PO_4$/NaOH buffer solution, pH 7), and cyclic voltammetry (CV) was performed at a sweep rate of 20 $mVs^{-1}$. The results are shown in FIG. 17A. FIG. 17B is an enlarged view of the CV curve obtained by using the glassy carbon electrode containing Nafion shown in FIG. 17A. As seen from FIGS. 17A and 17B, in the glassy carbon electrode containing Nafion, the oxidation-reduction peak current due to hexacyanoferrate ion serving as the electron mediator is 1/20 or less of that of the glassy carbon electrode not containing Nafion. This indicates that the hexacyanoferrate ion as polyvalent anion having negative charge like in Nafion as polyanion having negative charge do not diffuse and permeate.

Figure 18:
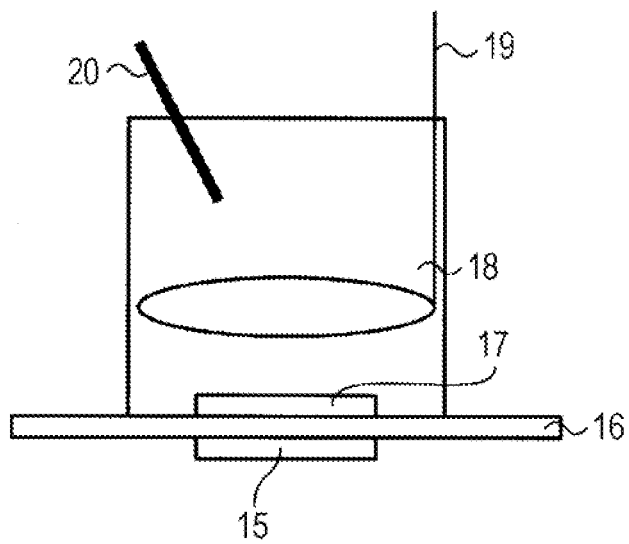
FIG. 18 is a schematic diagram showing a measurement system used for cyclic voltammetry performed for proving the effect of preventing permeation of an electron mediator in the biofuel cell according to the second embodiment.
Figure 19:
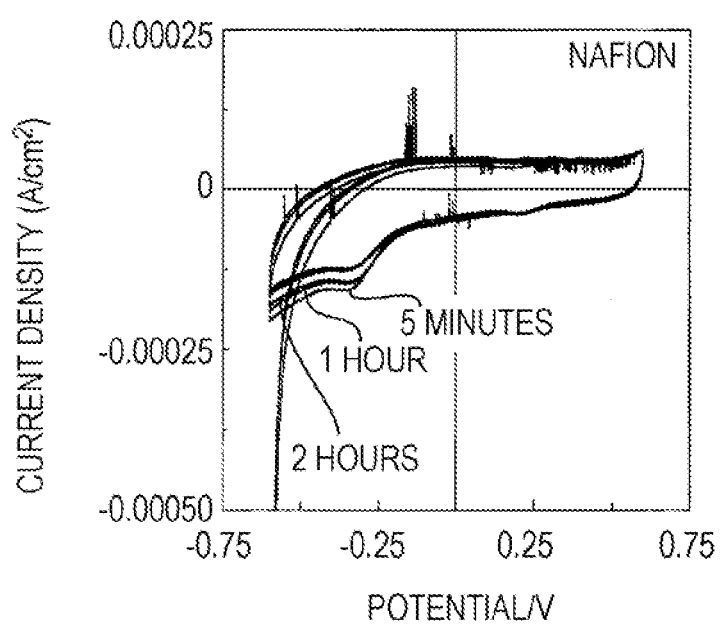
FIG. 19 is a schematic diagram showing the results of cyclic voltammetry performed for proving the effect of preventing permeation of an electron mediator in the biofuel cell according to the second embodiment.
Figure 20:
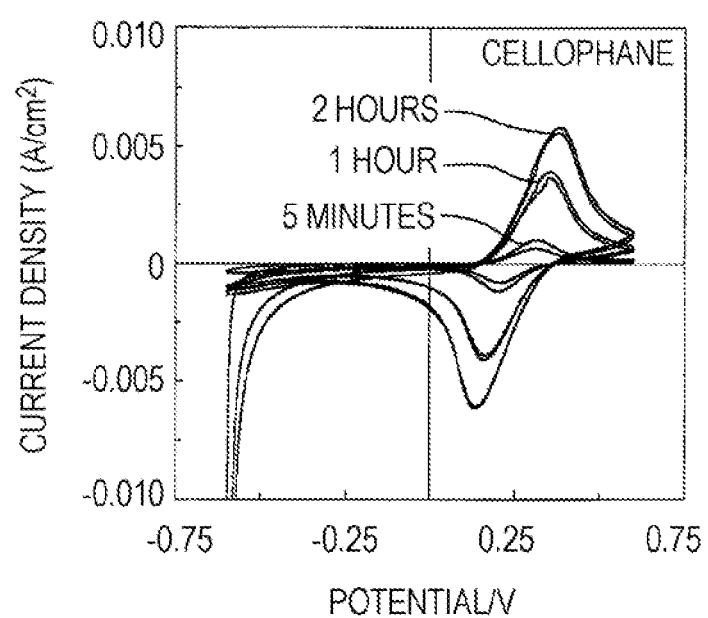
FIG. 20 is a schematic diagram showing the results of cyclic voltammetry performed for proving the effect of preventing permeation of an electron mediator in the biofuel cell according to the second embodiment.

Next, commercial carbon felt (manufactured by TORAY, B0050) was used as porous carbon and cut into a 1-cm square, and 80 μl of hexacyanoferrate ion (1 M) was penetrated into the carbon felt and then dried. Two of the thus-formed electrodes were stacked to form a test electrode. As shown in FIG. 18, a film-formed separator 16 (corresponding to the electrolyte layer 3) was placed on the test electrode 15, and a working electrode 17 was provided opposite to the test electrode 15 with the separator 16 provided therebetween. As the working electrode 17, a commercial carbon felt (manufactured by TORAY, B0050) cut into a 1-cm square was used. Then, a 0.4 M $NaH_2PO_4$/NaOH (pH 7) buffer solution 18 in which hexacyanoferrate ion was dissolved as an electron mediator (a vessel containing the buffer solution 18 is not shown) was brought into contact with the separator 16 and the working electrode 17. As the separator 16, cellophane having no charge and Nafion (pH 7) as polyanion having negative charge were used. Cyclic voltammetry was performed 5 minutes, 1 hour, and 2 hours after the contact between the separator 16 and the buffer solution 18 (electrolytic solution) in which hexacyanoferrate ion was dissolved, and the oxidation-reduction peak values of the electron mediator, i.e., hexacyanoferrate ion, permeating through the separator 16 from the test electrode 15 were compared. A counter electrode 19 and a reference electrode 20 were immersed in the buffer solution 18, and an electrochemical measurement apparatus (not shown) was connected to the working electrode 17, the counter electrode 19, and the reference electrode 20. A Pt wire was used as the counter electrode 19, and Ag|AgCl was used as the reference electrode 20. The measurement was performed under atmospheric pressure, and the measurement temperature was 25° C. FIG. 19 shows the results of measurement using Nafion as the separator 16. In addition, FIG. 20 shows the results of measurement using cellophane as the separator 16. As seen from FIGS. 19 and 20, when cellophane was used as the separator 16, an oxidation-reduction peak of hexacyanoferrate ion is observed 5 minutes after the start of measurement, and the oxidation-reduction peak value increases with the passage of time, while when Nafion was used as the separator 16, an oxidation-reduction peak of hexacyanoferrate ion is not observed even after the passage of 2 hours from the start of measurement. Therefore, it was confirmed that when cellophane is used as the separator 16, hexacyanoferrate ion permeates through the separator 16, while when Nafion is used as the separator 16, hexacyanoferrate ion does not permeate through the separator 16.

According to the second embodiment, in addition to the same advantages as in the first embodiment, the following advantage can be obtained. That is, since the electrolyte layer 3 has charge with the same sign as that of charge of an oxidized or reduced form of the electron mediator used on the positive electrode 2 and the negative electrode 1, the electron mediator on one of the positive electrode 2 and the negative electrode 1 can be effectively prevented from permeating through the electrolyte layer 3 and moving to the other of the positive electrode 2 and the negative electrode 1. Therefore, decrease in output of the biofuel cell and decrease in electric capacitance can be sufficiently suppressed.

Next, a biofuel cell according to a third embodiment is described.

FIGS. 21A, 21B, 21C and 22 show the biofuel cell, and FIGS. 21A, 21B, and 21C are a top view, a sectional view, and a rear view, respectively, of the biofuel cell, and 22 is an exploded perspective view showing exploded components of the biofuel cell.

As shown in FIGS. 21A, 21B, 21C, and 22, the biofuel cell includes a positive electrode 2, an electrolyte layer 3, and a negative electrode 1 which are accommodated in a space formed by a positive electrode current collector 51 and a negative electrode current collector 52 so as to be vertically sandwiched between the positive electrode current collector 51 and the negative electrode current collector 52. The positive electrode current collector 51, the negative electrode current collector 52, the positive electrode 2, the electrolyte layer 3, and the negative electrode 1 are brought into tight contact between adjacent ones. In this case, the positive electrode current collector 51, the negative electrode current collector 52, the positive electrode 2, the electrolyte layer 3, and the negative electrode 1 have a circular planar shape, and the whole biofuel cell also has a circular planar shape.

Figure 22:
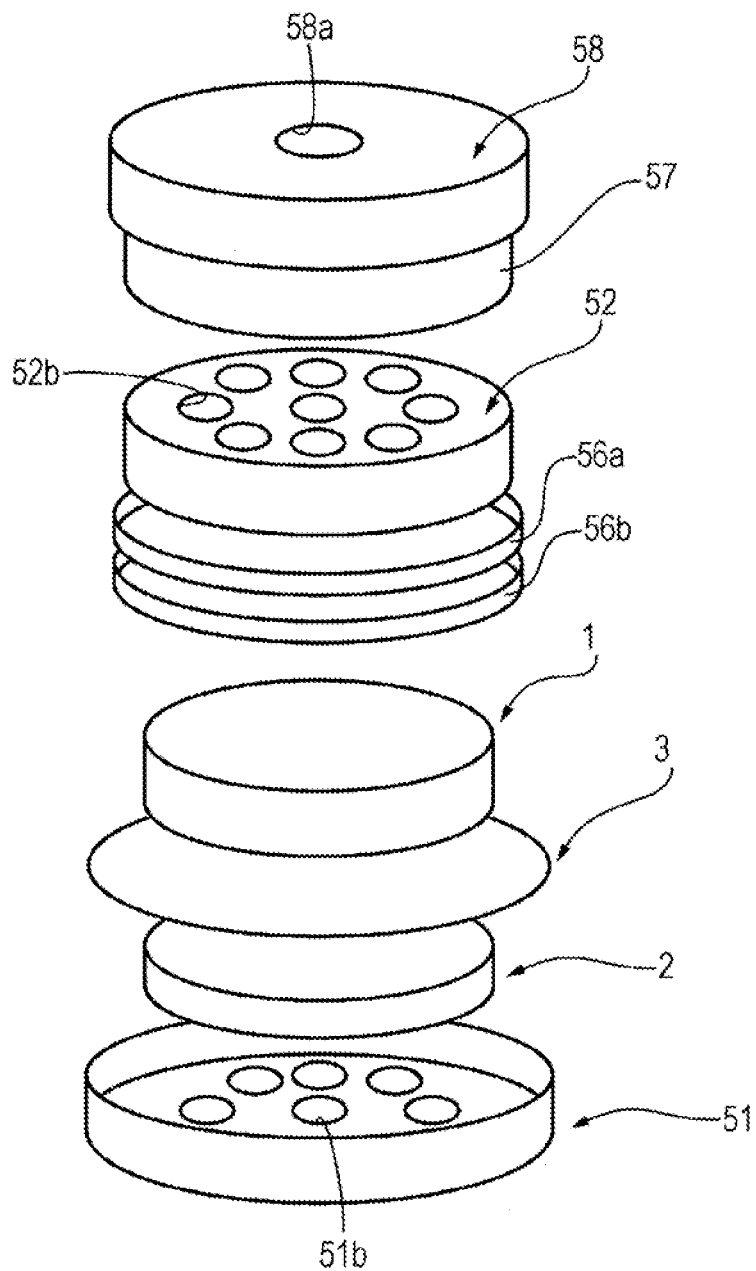
FIG. 22 is an exploded perspective view showing the biofuel cell according to the third embodiment.

The positive electrode current collector 51 is adapted for collecting a current produced in the positive electrode 2, and the current is taken out to the outside from the positive electrode current collector 51. The negative electrode current collector 52 is adapted for collecting a current produced in the negative electrode 1. The positive electrode current collector 51 and the negative electrode current collector 52 are generally made of a metal or an alloy, but the material is not limited to this. The positive electrode current collector 51 is flat and has a substantially cylindrical shape. Also, the negative electrode current collector 52 is flat and has a substantially cylindrical shape. The outer peripheral edge 51a of the positive electrode current collector 51 is caulked to the outer periphery 52a of the negative electrode current collector 52 through a ring-shaped gasket 56a made of an insulating material, such as silicone rubber, and a ring-shaped hydrophobic resin 56b made of, for example, polytetrafluoroethylene (PTFE), thereby forming a space in which the positive electrode 2, the electrolyte layer 3, and the negative electrode 1 are accommodated. The hydrophobic resin 56b is provided in the space surrounded by the positive electrode 2, the positive electrode current collector 51, and the gasket 56a so as to be in tight contact with the positive electrode 2, the positive electrode current collector 51, and the gasket 56a. The hydrophobic resin 56b an effectively suppress excessive permeation of fuel into the positive electrode 2. The end of the electrolyte layer 3 extends outward from the positive electrode 2 and the negative electrode 1 so as to be held between the gasket 56a and the hydrophobic resin 56b. The positive electrode current collector 51 has a plurality of oxidizer supply ports 51b provided over the entire surface of the bottom so that the positive electrode 2 is exposed in the oxidizer supply ports 51b. FIGS. 21C and 22 show thirteen circular oxidizer supply ports 51b, but this is an only example, and the number, the shape, the size, and the arrangement of the oxidizer supply ports 51b can be appropriately selected. The negative electrode current collector 52 also has a plurality of fuel supply ports 52b provided over the entire surface of the top so that the negative electrode 1 is exposed in the fuel supply ports 52b. FIG. 22 shows nine circular fuel supply ports 52b, but this is an only example, and the number, the shape, the size, and the arrangement of the fuel supply ports 52b can be appropriately selected.

The negative electrode current collector 52 has a cylindrical fuel tank 57 provided on the side opposite to the negative electrode 1. The fuel tank 57 is formed integrally with the negative electrode current collector 52. The fuel tank 57 contains fuel to be used (not shown), for example, a glucose solution or a glucose solution containing an electrolyte. In addition, a cylindrical cover 58 is detachably provided on the fuel tank 57. The cover 58 is inserted into or screwed on the fuel tank 57. Further, a circular fuel supply port 58a is formed at the center of the cover 58. The fuel supply port 58a is sealed by, for example, attaching a seal not shown.

The other configuration of the biofuel cell is the same as the first embodiment as long as they are not adverse to the properties.

Next, an example of the method for producing the biofuel cell is described. The production method is shown in FIGS. 23A to 23D.

Figure 23:
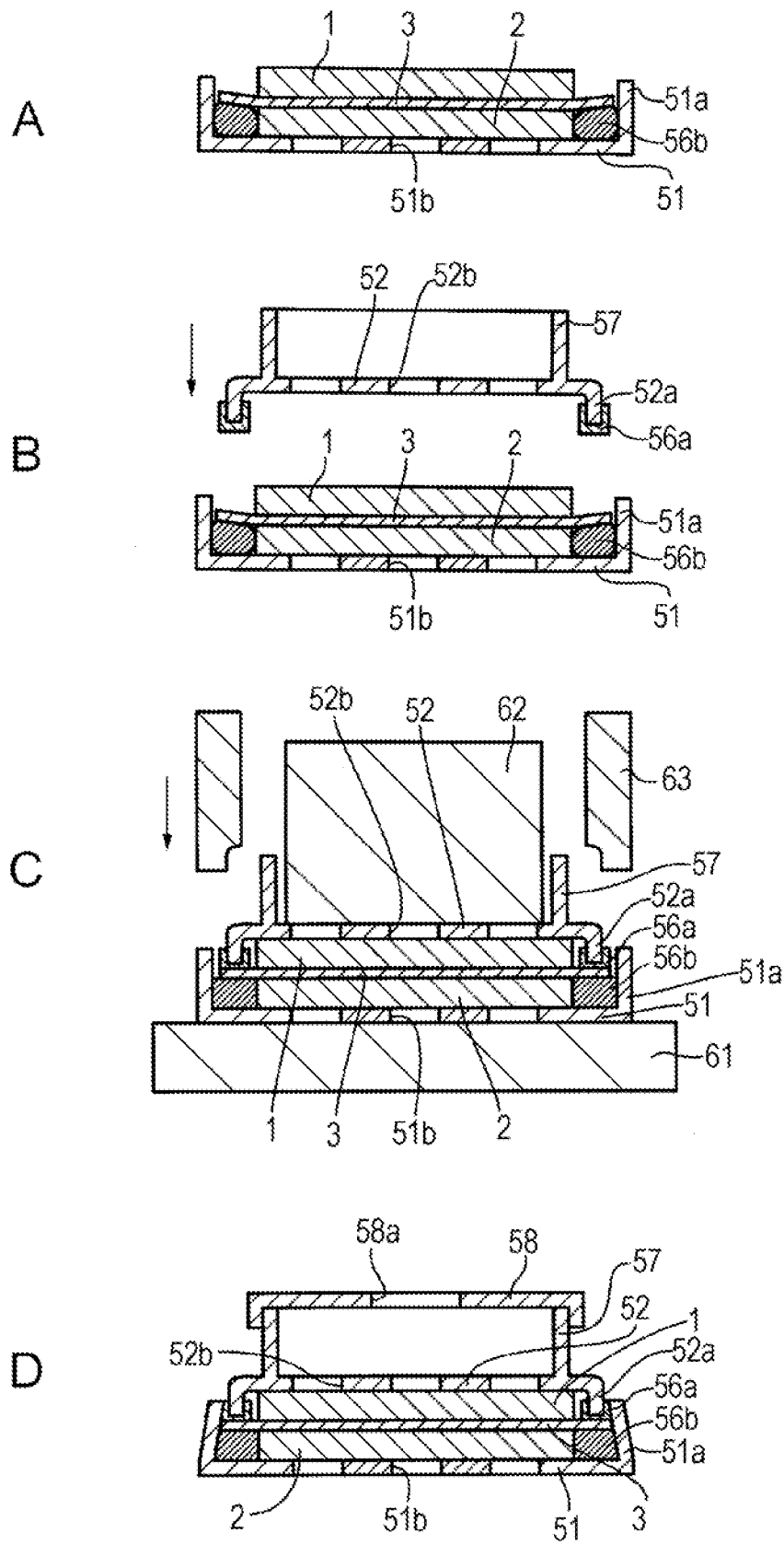
FIG. 23 is a schematic drawing for illustrating a method for manufacturing the biofuel cell according to the third embodiment.

As shown in FIG. 23A, first, the positive electrode current collector 51 having a cylindrical shape with an open end is prepared. The positive electrode current collector 51 has a plurality of oxidizer supply ports 51b provided over the entire surface of the bottom. The ring-shaped hydrophobic resin 56b is placed on the outer periphery of the bottom in the positive electrode current collector 51, and the positive electrode 2, the electrolyte layer 3, and the negative electrode 1 are stacked in order on the central portion of the bottom.

On the other hand, as shown in FIG. 23B, the negative electrode current collector 52 having a cylindrical shape with an open end is prepared, the cylindrical fuel tank 57 being integrally formed on the negative electrode current collector 52. The negative electrode current collector 52 has a plurality of fuel supply ports 52b provided over the entire surface thereof. Then, the gasket 56a having a U-like sectional shape is attached to the edge of the peripheral surface of the negative electrode current collector 52. Then, the negative electrode current collector 52 is placed on the negative electrode 1 so that the open side faces downward, and the positive electrode 2, the electrolyte layer 3, and the negative electrode 1 are held between the positive electrode current collector 51 and the negative electrode current collector 52.

Next, as shown in FIG. 23C, the positive electrode current collector 51 and the negative electrode current collector 52 with the positive electrode 2, the electrolyte layer 3, and the negative electrode 1 sandwiched therebetween are placed on a base 61 of a caulking machine, and the negative electrode current collector 52 is pressed with a pressing member 62 to bring the positive electrode current collector 51, the positive electrode 2, the electrolyte layer 3, the negative electrode 1, and the negative electrode current collector 52 into tight contact between adjacent ones. In this state, a caulking tool 63 is lowered to caulk the edge of the peripheral portion 51a of the positive electrode current collector 51 to the peripheral portion 52a of the negative electrode current collector 52 through the gasket 56a and the hydrophobic resin 56b. The caulking is performed so as to gradually crush the gasket 56a, thereby forming no space between the positive electrode current collector 51 and the gasket 56a and between the negative electrode current collector 52 and the gasket 56a. In this case, the hydrophobic resin 56b is also gradually compressed so as to be brought into tight contact with the positive electrode 2, the positive electrode current collector 51, and the gasket 56a. Therefore, the positive electrode current collector 51 and the negative electrode current collector 52 are electrically insulated from each other through the gasket 56a, forming a space therebetween in which the positive electrode 2, the electrolyte layer 3 and the negative electrode 1 are accommodated. Then, the caulking tool 63 is moved upward.

As a result, as shown in FIG. 23D, the biofuel cell is manufactured, in which the positive electrode 2, the electrolyte layer 3, and the negative electrode 1 are accommodated in the space formed by the positive electrode current collector 51 and the negative electrode current collector 52.

Next, the cover 58 is attached to the fuel tank 57, and the fuel and the electrolyte are injected through the fuel supply port 58a of the cover 58. Then, a sealing seal is attached to the fuel supply port 58a to close it. However, the fuel and electrolyte may be injected into the fuel tank 57 in the step shown in FIG. 23B.

In the biofuel cell, for example, when a glucose solution is used as the fuel to be charged in the fuel tank 57, on the negative electrode 1, the glucose supplied is decomposed with the enzyme to taken out electrons and produce $H^+$. On the positive electrode 2, water is produced from $H^+$ transferred from the negative electrode 1 through the electrolyte layer 3, the electrons transferred from the negative electrode 1 through an external circuit, and oxygen, for example, air oxygen. As a result, an output voltage is produced between the positive electrode current collector 51 and the negative electrode current collector 52.

Figure 24:
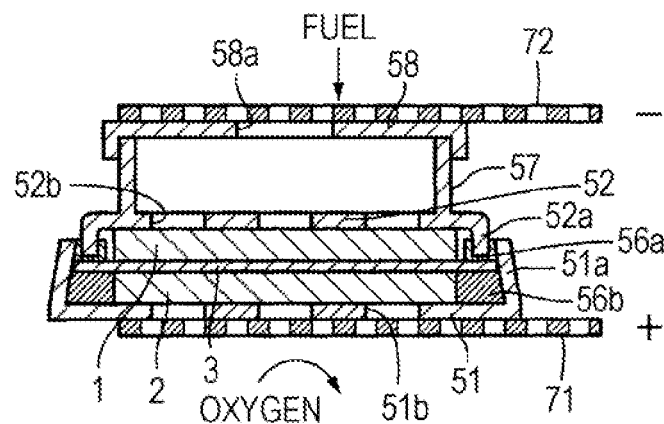
FIG. 24 is a schematic drawing for illustrating a first example of a method of using the biofuel cell according to the third embodiment.

As shown in FIG. 24, mesh electrodes 71 and 72 may be formed on the positive electrode current collector 51 and the negative electrode current collector 52, respectively, in the biofuel cell. In this case, outside air enters the oxidizer supply ports 51b of the positive electrode current collector 51 through holes of the mesh electrode 71, and fuel enters the fuel tank 57 from the fuel supply port 58a of the cover 58 through holes of the mesh electrode 72.

Figure 25:
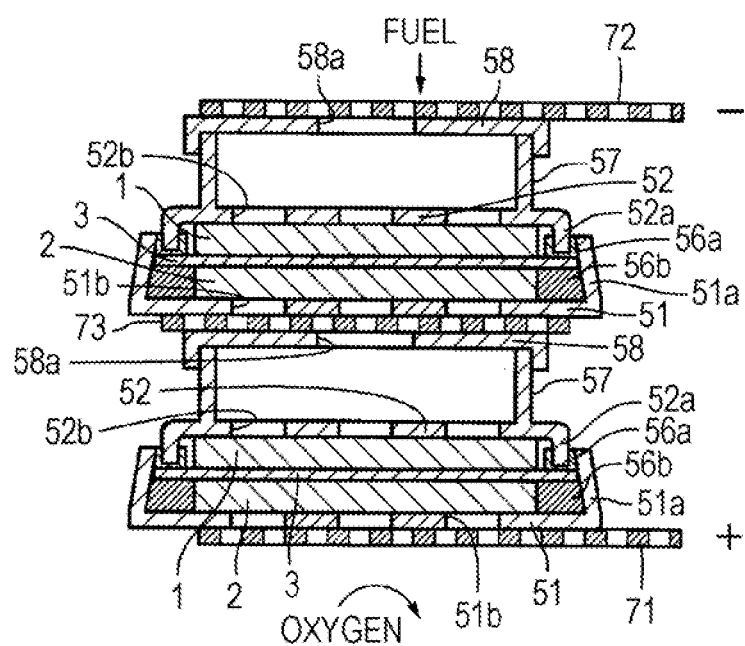
FIG. 25 is a schematic drawing for illustrating a second example of a method of using the biofuel cell according to the third embodiment.

FIG. 25 shows a case in which two biofuel cells are connected in series. In this case, a mesh electrode 73 is sandwiched between the positive electrode current collector 51 of one (in the drawing, the upper biofuel cell) of the biofuel cells and the cover 58 of the other biofuel cell (in the drawing, the lower biofuel cell). Therefore, outside air enters the oxidizer supply ports 51b of the positive electrode current collector 51 through holes of the mesh electrode 73. The fuel can be supplied using a fuel supply system.

Figure 26:
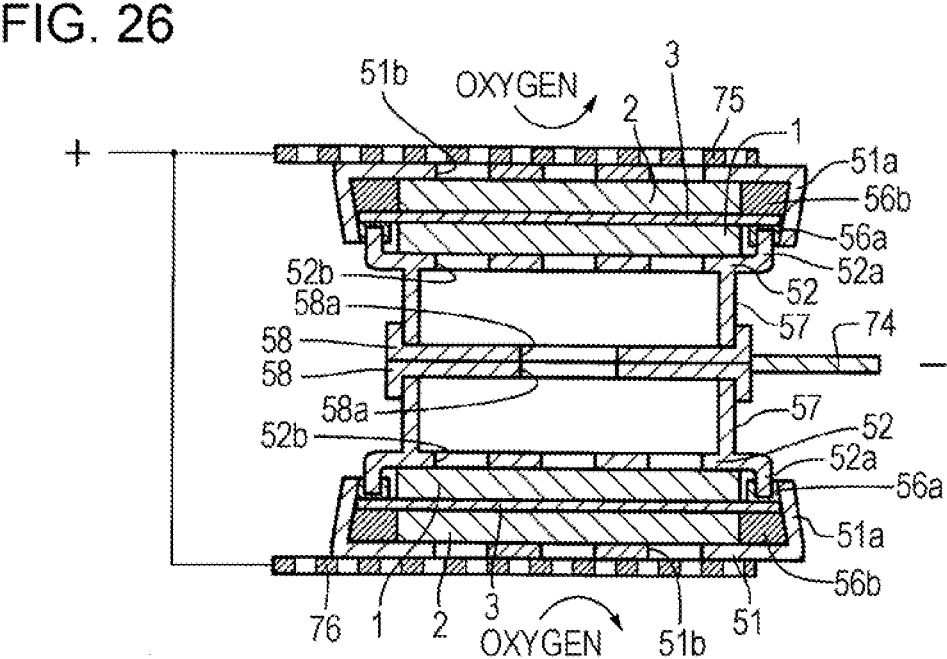
FIG. 26 is a schematic drawing for illustrating a third example of a method of using the biofuel cell according to the third embodiment.

FIG. 26 shows a case in which two biofuel cells are connected in parallel. In this case, the fuel tank 57 of one (in the drawing, the upper biofuel cell) of the two biofuel cells and the fuel tank 57 of the other biofuel cell (in the drawing, the lower biofuel cell) were brought into contact with each other so that the fuel supply ports 58a of the covers 58 coincide with each other, and an electrode 74 is drawn out from the sides of the fuel tanks 57. In addition, mesh electrodes 75 and 76 are formed on the positive electrode current collector 51 of one of the biofuel cells and the positive electrode current collector 51 of the other biofuel cell. These mesh electrodes 75 and 76 are connected to each other. Outside air enters the oxidizer supply ports 51b of the positive electrode current collectors 51 through holes of the mesh electrodes 75 and 76.

In accordance with the third embodiment, in the coil-type or button-type biofuel cell excluding the fuel tank 57, the same advantages as in the first embodiment can be obtained. In addition, in the biofuel cell, the positive electrode 2, the electrolyte layer 3, and the negative electrode 1 are sandwiched between the positive electrode current collector 51 and the negative electrode current collector 52, and the edge of the outer periphery 51a of the positive electrode current collector 51 is caulked to the outer periphery 52a of the negative electrode current collector 52 through the gasket 56a. In the biofuel cell, the components can be uniformly bonded together, thereby preventing variation in output and leakage of the cell solution such as the fuel and the electrolyte from the interfaces between the respective components. In addition, the biofuel cell is manufactured by a simple manufacturing process, and the biofuel cell can be easily reduced in size. Further, the biofuel cell uses the glucose solution and starch as fuel, and about pH 7 (neutral) is selected as the pH of the electrolyte used so that the biofuel cell is safe even if the fuel and the electrolyte leak to the outside.

Further, in an air cell which is currently put into practical use, fuel and an electrolyte must be added during manufacture, thereby causing difficulty in adding the fuel and electrolyte after manufacture, while in the biofuel cell, the fuel and electrolyte can be added after manufacture, thereby facilitating the manufacture as compared with an air cell which is currently put into practical use.

Next, a biofuel cell according to a fourth embodiment will be described.

Figure 27:
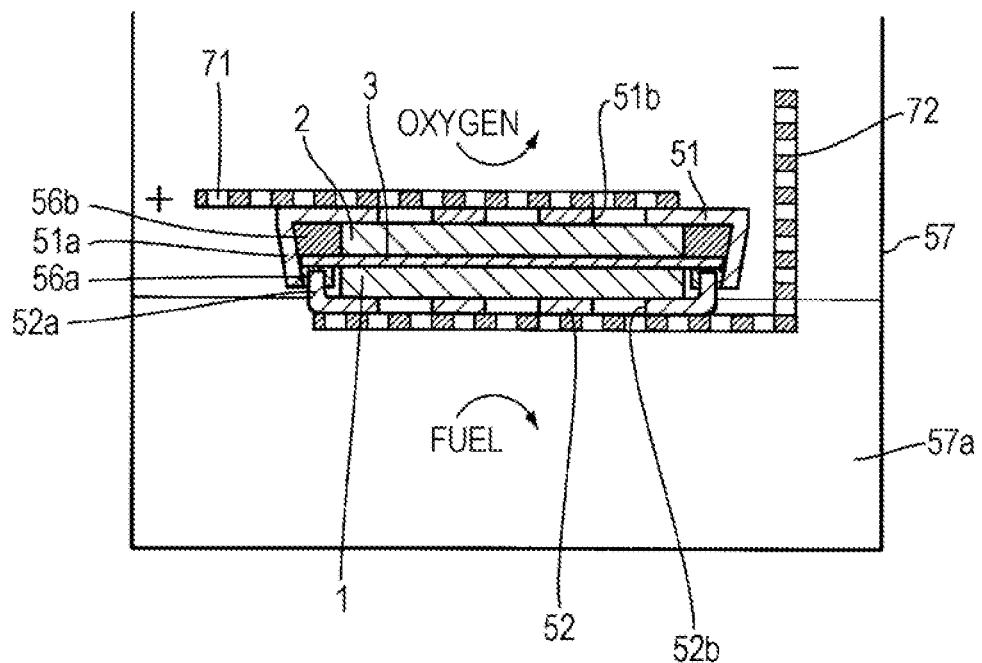
FIG. 27 is a schematic drawing showing a method of using a biofuel cell according to a fourth embodiment.

As shown in FIG. 27, in accordance with the fourth embodiment, the fuel tank 57 provided integrally with the negative electrode current collector 52 is removed from the biofuel cell according to the third embodiment, and further, the mesh electrodes 71 and 72 are formed on the positive electrode current collector 51 and the negative electrode current collector 52, respectively, so that when used, the biofuel cell floats on the fuel 57a charged in an open fuel tank 57 with the negative electrode 1 disposed on the lower side and the positive electrode 2 disposed on the upper side.

The other characteristics of the fourth embodiment are the same as in the first and third embodiments as long as they are not adverse to the properties.

In accordance with the fourth embodiment, the same advantages as those of the first and third embodiments can be obtained.

Next, a biofuel cell according to a fifth embodiment of the present invention will be described. Although the biofuel cell according to the third embodiment is a coin or button type, the biofuel cell of the fifth embodiment is a cylindrical type.

Figure 28:
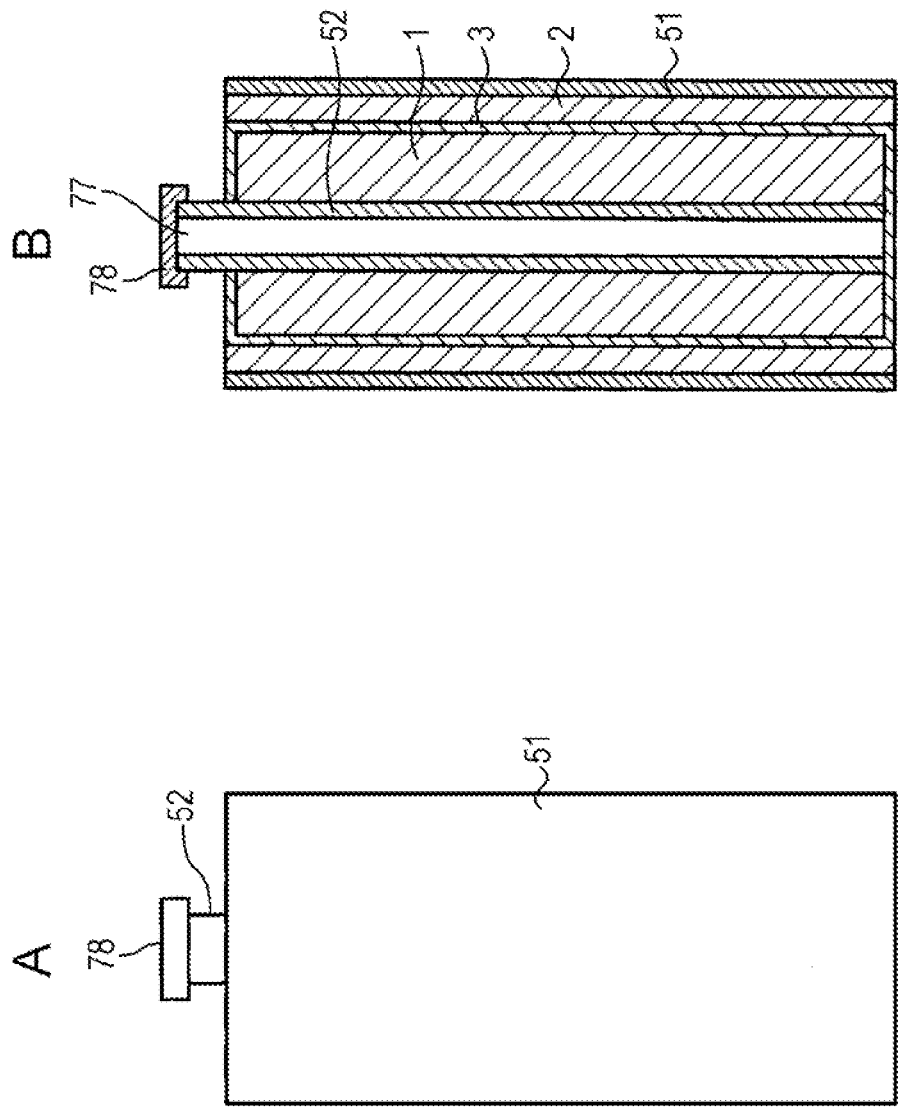
FIG. 28 is a front view and a longitudinal sectional view showing a biofuel cell according to a fifth embodiment.
Figure 29:
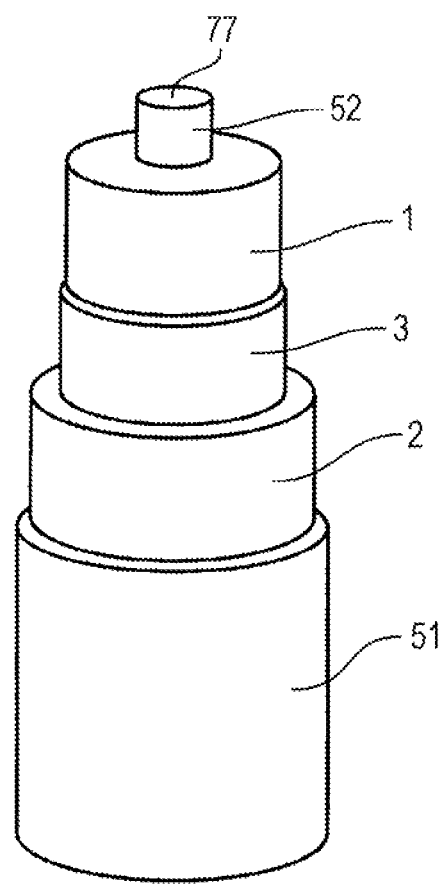
FIG. 29 is an exploded perspective view showing the biofuel cell according to the fifth embodiment.

FIGS. 28A, 28B, and 29 show the biofuel cell, FIGS. 28A and 28B are a front view and a longitudinal sectional view, respectively, of the biofuel cell, and FIG. 29 is an exploded perspective view showing the exploded components of the biofuel cell.

As shown in FIGS. 28A, 28B, and 29, in the biofuel cell, a cylindrical negative electrode current collector 52, negative electrode 1, electrolyte layer 3, positive electrode 2, and positive electrode current collector 51 are provided in order on the outer periphery of a cylindrical fuel holding portion 77. In this case, the fuel holding portion 77 includes a space surrounded by the cylindrical negative electrode current collector 52. An end of the fuel holding portion 77 projects outward, and a cover 78 is provided on the end. Although not shown in the drawings, a plurality of fuel supply ports 52b is formed over the entire surface of the negative electrode current collector 52 provided on the outer periphery of the cylindrical fuel holding portion 77. In addition, the electrolyte layer 3 is formed in a bag shape which wraps the negative electrode 1 and the negative electrode current collector 52. The portion between the electrolyte layer 3 and the negative electrode current collector 52 at an end of the fuel holding portion 77 is sealed with, for example, a sealing member (not shown) so as to prevent fuel leakage from the portion.

In the biofuel cell, a fuel and electrolyte are charged in the fuel holding portion 77. The fuel and electrolyte pass through the fuel supply ports 52b of the negative electrode current collector 52, reach the negative electrode 1, and permeates into voids of the negative electrode 1 to be stored in the negative electrode 1. In order to increase the amount of the fuel stored in the negative electrode 1, the porosity of the negative electrode 1 is preferably, for example, 60% or more, but is not limited to this.

In the biofuel cell, a vapor-liquid separation layer may be provided on the outer periphery of the positive electrode current collector 51 in order to improve durability. As a material for the vapor-liquid separation layer, for example, a waterproof moisture-permeable material (a composite material of polyurethane polymer and a stretched polytetrafluoroethylene film) (e.g., Gore-Tex (trade name) manufactured by WL Gore & Associates) is used. In order to uniformly bond together the components of the biofuel cell, preferably, stretchable rubber (may be a band or sheet) having a network structure permeable to outside air is wound inside or outside the vapor-liquid separation layer, for compressing the whole of the components of the biofuel cell.

The other characteristics of the fifth embodiment are the same as in the first and third embodiments as long as they are not adverse to the properties.

In accordance with the fifth embodiment, the same advantages as those of the first and third embodiments can be obtained.

Next, a biofuel cell according to a sixth embodiment will be described.

The biofuel cell according to the sixth embodiment has the same configuration as the biofuel cell according to the first embodiment except that a porous conductive material as shown in FIGS. 30A and 30B is used as a material of the electrode 11 of the negative electrode 1.

FIG. 30A schematically shows a structure of the porous conductive material, and FIG. 30B is a sectional view of a skeleton of the porous conductive material. As shown in FIGS. 30A and 30B, the porous conductive material includes a skeleton 81 composed of a porous material with a three-dimensional network structure, and a carbon-based material 82 coating the surface of the skeleton 81. The porous conductive material has a three-dimensional network structure in which many holes 83 surrounded by the carbon-based material 82 correspond to meshes. In this case, the holes 83 communicate with each other. The carbon-based material 82 may be any one of forms, such as a fibrous form (needle-like), a granular form, and the like.

The skeleton 81 composed of the porous material is made of a foamed metal or foamed alloy, for example, foamed nickel. The porosity of the skeleton 81 is generally 85% or more and more generally 90% or more, and the pore size is generally, for example, 10 nm to 1 mm, more generally 10 nm to 600 μm, still more generally 1 to 600 μm, typically 50 to 300 μm, and more typically 100 to 250 μm. As the carbon-based material 82, for example, a high-conductivity material such as Ketjenblack is preferred, but a functional carbon material such as carbon nanotubes, fullerene, or the like may be used.

The porosity of the porous conductive material is generally 80% or more and more generally 90% or more, and the pore size of the pores 83 is generally, for example, 9 nm to 1 mm, more generally 9 nm to 600 μm, still more generally 1 to 600 μm, typically 30 to 400 μm, and more typically 80 to 230 μm.

Next, a method for producing the porous conductive material will be described.

As shown in FIG. 31A, first, the skeleton 81 composed of a foamed metal or a foamed alloy (e.g., foamed nickel) is prepared.

Next, as shown in FIG. 31B, the surface of the skeleton 81 composed of a foamed metal or foamed alloy is coated with the carbon-based material 82. As the coating method, a general coating method can be used. For example, an emulsion containing carbon powder and an appropriate binder is sprayed on the surface of the skeleton 81 using a spray to coat the surface with the carbon-based material 82. The coating thickness of the carbon-based material 82 is determined according to the porosity and pore size required for the porous conductive material in consideration of the porosity and pore size of the skeleton 82 composed of a foamed metal or foamed alloy. The coating is performed so that many holes 83 surrounded by the carbon-based material 82 communicate with each other.

As a result, the intended porous conductive material is produced.

According to the fourth embodiment, the porous conductive material including the skeleton 81 composed of a foamed metal or foamed alloy with the surface coated with the carbon-based material 82 can have sufficiently large holes 83, a coarse three-dimensional network structure, high strength, high conductivity, and a sufficiently high surface area. Therefore, when the electrode 11 is formed using the porous conductive material, an enzyme metabolism reaction can be effected with high efficiency on the negative electrode 1 including an enzyme, a coenzyme, an electron mediator immobilized on the electrode 11, or an enzyme reaction phenomenon taking place near the electrode 11 can be efficiently captured as an electrical signal. In addition, it is possible to realize a biofuel cell with high performance and safety regardless of operation environments.

Next, a biofuel cell according to a seventh embodiment will be described.

The biofuel cell uses starch which is a polysaccharide as fuel. In addition, glucoamylase which is a catabolic enzyme decomposing starch into glucose is also immobilized on the negative electrode 1 in association with the use of starch as the fuel.

In the biofuel cell, when starch is supplied as the fuel to the negative electrode 1, the starch is hydrolyzed into glucose with glucoamylase, and the glucose is decomposed with glucose dehydrogenase. Further, $NAD^+$ is reduced in association with oxidation reaction in the decomposition process to produce NADH which is separated into two electrons, $NAD^+$, and $H^+$ by oxidation with diaphorase. Therefore, two electrons and two $H^+$ are produced in one step of oxidation reaction per molecular of glucose, and four electrons and four $H^+$ in total are produced in two steps of oxidation reaction. The thus-produced electrons are transferred to the electrode 11 of the negative electrode 1, and $H^+$ moves to the positive electrode 2 through the electrolyte layer 3. On the positive electrode 2, $H^+$ reacts with oxygen supplied from the outside and the electrons supplied from the negative electrode 1 through an external circuit to produce $H_2O$.

The other characteristics of the seventh embodiment are the same as the biofuel cell according to the first embodiment.

In accordance with the seventh embodiment, the same advantages as those of the first embodiment can be obtained, and it is possible to obtain the advantage that since starch is used as the fuel, the amount of electricity generated can be increased as compared with when glucose is used as fuel.

The numerical values, structures, configurations, shapes, and materials given in the above-described embodiments are only examples, and different numerical values, structures, configurations, shapes, and materials may be used according to demand.

In addition, in a conventional biofuel cell, the selection of an electron mediator functioning to transfer electrons between an enzyme and an electrode greatly affects the output of the cell. Namely, there is a problem that when an electron mediator having a small difference in free energy from a substrate is selected for increasing the output voltage of the cell, a current value cannot be obtained, and conversely, when an electron mediator having a large difference in free energy from a substrate is selected, the current capacity is decreased. This problem can be solved by simultaneously using two or more types of electron mediators having different oxidation-reduction potentials on the negative electrode 1 and/or the positive electrode 2 so that both the high output voltage and high current can be properly used. In this case, the oxidation-reduction potentials of the two or more types of electron mediators are 50 mV or more, more preferably 100 mV or more, and still more preferably 200 mV or more different from each other at pH 7. In this way, when two or more types of electron mediators are used as electron mediators immobilized on the negative electrode 1 or the positive electrode 2, it is possible to realize a biofuel cell capable of a cell operation at a high potential with a small energy loss when a low output is required and capable of resisting high output with a large energy loss when a high output is required.

Figure 32:
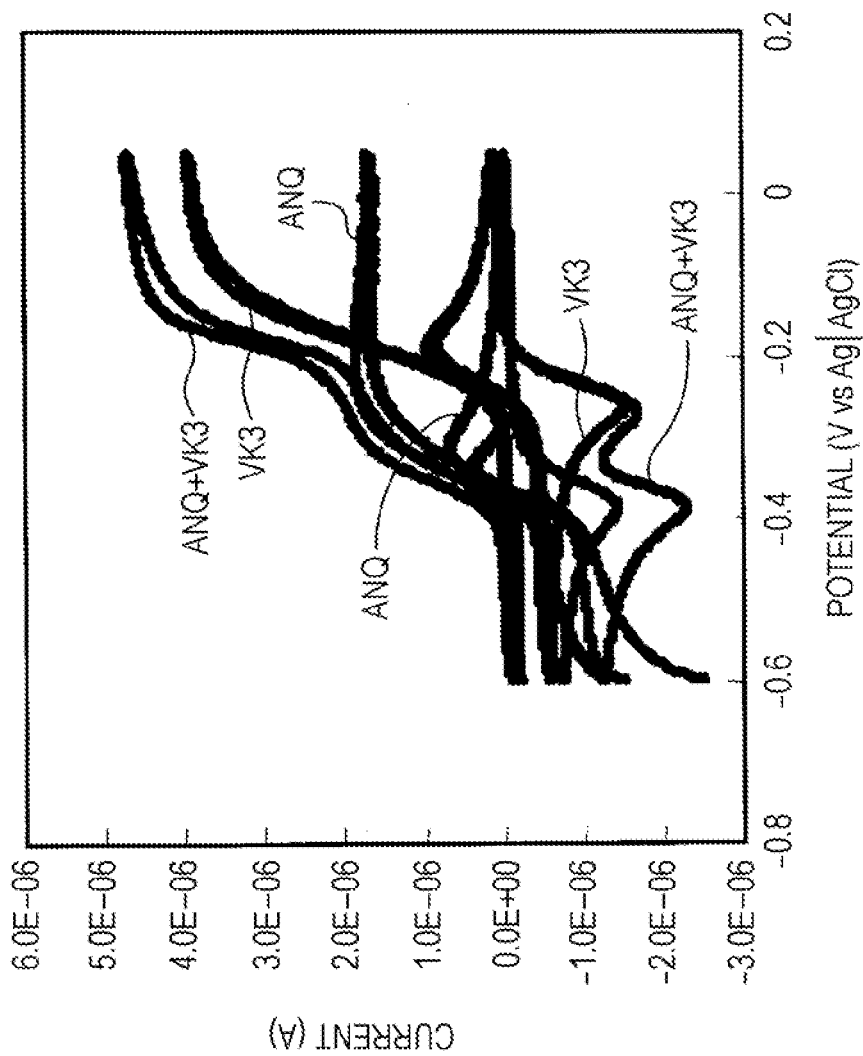
FIG. 32 is a schematic diagram showing the results of cyclic voltammetry performed using one type and various types of electron mediators in a biofuel cell.

FIG. 32 shows the results of cyclic voltammetry using 0.1M $NaH_2PO_4$/NaOH buffer solutions (pH 7) respectively containing only 100 μM VK3 (vitamin K3), only 100 μM ANQ, and 100 μM of each of VK3 and ANQ. The oxidation-reduction potentials of VK3 and ANQ at pH 7 are −0.22 V and −0.33 V (vs. Ag|AgCl), respectively, and a difference between both oxidation-reduction potentials is 0.11 V (110 mV). Then, after each of the solutions was adjusted so that the NADH concentration was 5 mM, and the concentration of enzyme diaphorase was 0.16 μM, cyclic voltammetry was performed. The results are also shown in FIG. 32. As seen from FIG. 32, when VK3 and ANQ having a difference of 110 mV in oxidation-reduction potential at pH 7 are used as electron mediators, a high output voltage and a high output current can be realized as compared with the case in which VK3 and ANQ are separately used.

Figure 33:
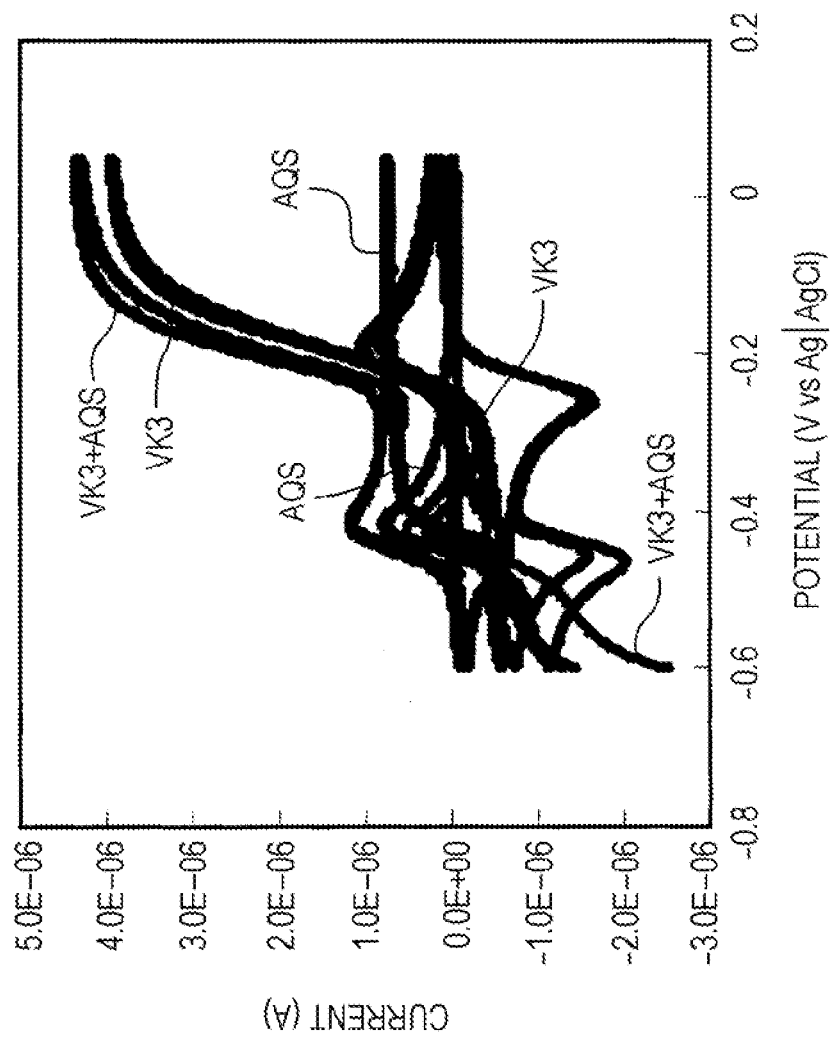
FIG. 33 is a schematic diagram showing the results of cyclic voltammetry performed using one type and various types of electron mediators in a biofuel cell.

FIG. 33 shows the results of cyclic voltammetry using 0.1M $NaH_2PO_4$/NaOH buffer solutions (pH 7) respectively containing only 100 μM VK3, only 100 μM AQS, and 100 μM of each of VK3 and AQS. The oxidation-reduction potentials of VK3 and AQS at pH 7 are −0.22 V and −0.42 V (vs. Ag|AgCl), respectively, and a difference between both oxidation-reduction potentials is 0.2 V (200 mV). Then, after each of the solutions was adjusted so that the NADH concentration was 5 mM, and the concentration of enzyme diaphorase was 0.16 μM, cyclic voltammetry was performed. The results are also shown in FIG. 33. As seen from FIG. 33, when VK3 and AQS having a difference of 200 mV in oxidation-reduction potential at pH 7 are used as electron mediators, a high output voltage and a high output current can be realized as compared with the case in which VK3 and AQS are separately used.

Figure 34:
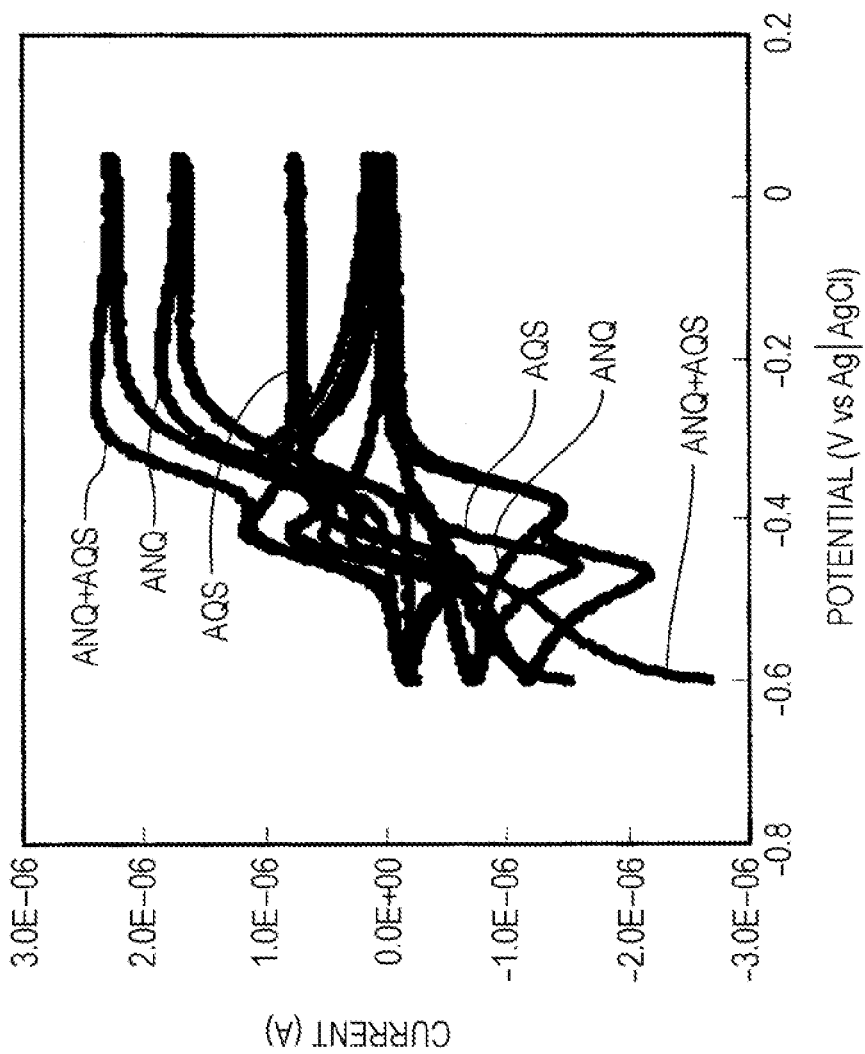
FIG. 34 is a schematic diagram showing the results of cyclic voltammetry performed using one type and various types of electron mediators in a biofuel cell.

FIG. 34 shows the results of cyclic voltammetry using 0.1M $NaH_2PO_4$/NaOH buffer solutions (pH 7) respectively containing only 100 μM ANQ, only 100 μM AQS, and 100 μM of each of ANQ and AQS. The oxidation-reduction potentials of ANQ and AQS at pH 7 are −0.33 V and −0.42 V (vs. Ag|AgCl), respectively, and a difference between both oxidation-reduction potentials is 0.09 V (90 mV). Then, after each of the solutions was adjusted so that the NADH concentration was 5 mM, and the concentration of enzyme diaphorase was 0.16 μM, cyclic voltammetry was performed. The results are also shown in FIG. 34. As seen from FIG. 34, when ANQ and AQS having a difference of 90 mV in oxidation-reduction potential at pH 7 are used as electron mediators, a high output voltage and a high output current can be realized as compared with the case in which ANQ and AQS are separately used.

In addition, as described above, the use of two or more types of electron mediators having different oxidation-reduction potentials is effective in applying to not only a biofuel cell using an enzyme but also a biofuel cell using microorganisms or cells and an electron mediator, and more generally effective in applying to general electrode reaction-using apparatuses (a biofuel cell, a biosensor, a bioreactor, and the like) using electron mediators.

Embodiments will be described with reference to the drawings.

FIG. 1 schematically shows a biofuel cell according to a first embodiment. In this biofuel cell, glucose is used as fuel. FIG. 2 schematically shows the detail configuration of a negative electrode, an example of an enzyme group immobilized on the negative electrode, and electron transfer reaction of the enzyme group in the biofuel cell.

As shown in FIG. 1, the biofuel cell has a structure in which a negative electrode 1 and a positive electrode 2 are opposed to each other with an electrolyte layer 3 provided therebetween which conducts only protons. On the negative electrode 1, the glucose supplied is decomposed with an enzyme to take out electrons and produce protons ($H^+$). On the positive electrode 2, water is produced from protons transferred from the negative electrode 1 through the electrolyte layer 3, the electrons transferred from the negative electrode 1 through an external circuit, and oxygen, for example, air oxygen.

The negative electrode 1 has a configuration in which on an electrode 11 (refer to FIG. 2) composed of, for example, porous carbon, an enzyme involved in decomposition of glucose, a coenzyme (e.g., $NAD^+$, $NADP^+$, or the like) producing a reduced form in association with an oxidation reaction in the glucose decomposition process, a coenzyme oxidase (e.g., diaphorase) which oxidizes the reduced form of the coenzyme (e.g., NADH, NADPH, or the like), and an electron mediator which receives, from the coenzyme oxidase, electrons produced in association with oxidation of the coenzyme and supplies the electrons to the electrode 11 are immobilized by an immobilization material composed of, for example, a polymer.

As the enzyme involved in decomposition of glucose, for example, glucose dehydrogenase (GDH) can be used. When this oxidase is present, for example, β-D-glucose can be oxidized into D-glucono-δ-lactone.

Further, the D-glucono-δ-lactone can be decomposed into 2-keto-6-phospho-D-gluconate by the presence of two enzymes, i.e., gluconokinase and phosphogluconate dehydrogenase (PhGDH). In other words, the D-glucono-δ-lactone is converted into D-gluconate by hydrolysis, and the D-gluconate is phosphorylated to 6-phospho-D-gluconate by hydrolysis of adenosine triphosphate (ATP) into adenosine diphosphate (ADP) and phosphoric acid in the presence of gluconokinase. The 6-phospho-D-gluconate is oxidized into 2-keto-6-phospho-D-gluconate by the action of the oxidase PhGDH.

The glucose can be decomposed into $CO_2$ by utilizing glucose metabolism other than the above-described decomposition process. The decomposition process utilizing glucose metabolism is roughly divided into glucose decomposition by a glycolytic system, production of pyruvic acid, and a TCA cycle, which are widespread reaction systems.

The oxidation reaction in the decomposition process of a monosaccharide proceeds in association with a reduction reaction of a coenzyme. The coenzyme is substantially determined according to the enzyme acting, and in the case of GDH, $NAD^+$ is used as the coenzyme. Namely, when β-D-glucose is oxidized into D-glucono-δ-lactone by the action of GDH, $NAD^+$ is reduced into NADH, producing $H^+$.

The produced NADH is immediately oxidized into $NAD^+$ in the presence of diaphorase (DI), producing two electrons and $H^+$. Therefore, two electrons and two $H^+$ are produced in one step of oxidation reaction per molecule of glucose, and four electrons and four $H^+$ in total are produced in two steps of oxidation reaction.

The electrons produced in the above-mentioned process are transferred to the electrode 11 from diaphorase through the electron mediator, and $H^+$ are transferred to the positive electrode 2 through the electrolyte layer 3.

The electron mediator receives and transfers electrons from and to the electrode 11, and the output voltage of the fuel cell depends on the oxidation-reduction potential of the electron mediator. In other words, in order to obtain a higher output voltage, the electron mediator with a more negative potential is preferably selected for the negative electrode 1. However, it is necessary to consider the reaction affinity of the electron mediator for the enzyme, the rate of electron exchange to the electrode 11, the structural stability to inhibitors (light, oxygen, and the like), and the like. From this viewpoint, as the electron mediator used for the negative electrode 1,2-amino-3-carboxy-1,4-naphthoquinone (ACNQ) or vitamin K3 is preferably used. Examples of other usable electron mediators include compounds having a quinone skeleton, metal complexes of osmium (Os), ruthenium (Ru), iron (Fe), and cobalt (Co), viologen compounds such as benzylviologen, compounds having a nicotinamide structure, compounds having a riboflavin structure, compounds having a nucleotide phosphate structure, and the like.

The electrolyte layer 3 is a proton conductor adapted for transferring $H^+$ produced on the negative electrode 1 to the positive electrode 2 and is composed of a material which has no electron conductivity and is capable of transferring $H^+$. As the electrolyte layer 3, for example, a material appropriately selected from the above-described examples can be used. In this case, the electrolyte layer 3 contains a buffer solution containing a compound having an imidazole ring as a buffer material. The compound having an imidazole ring can be appropriately selected from the above-described compounds, for example, imidazole. The concentration of the compound having an imidazole ring as the buffer material is selected according to demand but can be preferably 0.2 M to 3 M. In this case, the high buffer ability can be achieved, and the original ability of the enzyme can be sufficiently exhibited even in a high-output operation of the fuel cell. Further, excessively high or low ionic strength adversely affects the enzyme activity, but the ionic strength is preferably proper ionic strength, for example, about 0.3, in view of electrochemical response. However, there are optimum values of pH and ionic strength for the enzyme used, and the pH and ionic strength are not limited to the above-described values.

The enzyme, the coenzyme, and the electron mediator are preferably immobilized on the electrode 11 with an immobilization material in order to efficiently capture as an electrical signal an enzyme reaction phenomenon taking place near the electrode. Further, the enzyme reaction system on the negative electrode 1 can be stabilized by immobilizing the enzyme which decomposes fuel and the coenzyme on the electrode 11. Examples of such an immobilization material include a combination of glutaraldehyde (GA) and poly-L-lysine (PLL) and a combination of sodium polyacrylate (PAAcNa) and poly-L-lysine (PLL). These may be used alone or another polymer may be further used. When a combination of glutaraldehyde and poly-L-lysine is used as the immobilization material, the enzyme immobilizing ability possessed by each material can be greatly improved, thereby achieving the excellent enzyme immobilizing ability of the immobilization material as a whole. In this case, the optimum composition ratio between glutaraldehyde and poly-L-lysine varies depending on the enzyme to be immobilized and the substrate of the enzyme, but may be generally a desired value. For example, when an aqueous solution of glutaraldehyde (0.125%) and an aqueous solution of poly-L-lysine (1%) are used, the ratio may be 1:1, 1:2, or 2:1.

FIG. 2 shows as an example the case in which the enzyme involved in glucose decomposition is glucose dehydrogenase (GDH), the coenzyme which produces a reduced form in association with an oxidation reaction in the glucose decomposition process is $NAD^+$, the coenzyme oxidase which oxidizes the reduced form NADH of the coenzyme is diaphorase (DI), and the electron mediator which receives, from the coenzyme oxidase, electrons produced in association with oxidation of the coenzyme and supplies the electrons to the electrode 11 is ACNQ.

On the positive electrode 2, the oxygen-reductase and the electron mediator which receives and supplies electrons from and to an electrode are immobilized on an electrode composed of, for example, porous carbon. As the oxygen-reductase, for example, bilirubin oxidase (BOD), laccase, ascorbate oxidase, or the like can be used. As the electron mediator, for example, hexacyanoferrate ion produced by dissociation of potassium hexacyanoferrate can be used. The electron mediator is preferably immobilized at a sufficiently high concentration, for example, $0.64 \times 10^{-6}$ mol/mm$^2$ or more in average.

On the positive electrode 2, oxygen in air is reduced with H+ from the electrolyte layer 3 and electrons from the negative electrode 1 in the presence of the oxygen-reductase to produce water.

In the fuel cell configured as described above, when glucose is supplied to the negative electrode 1 side, the glucose is decomposed with the catabolic enzyme containing the oxydase. Since the oxydase is involved in the decomposition process of the monosaccharide, electrons and H+ can be produced on the negative electrode 1 side, and a current can be generated between the negative electrode 1 and the positive electrode 2.

Next, description is made of the effect of maintaining and improving the current value when BOD was immobilized as the oxygen-reductase on the positive electrode 2 and a mixture of imidazole and hydrochloric acid, which was adjusted to pH 7, was used as the buffer solution. Table 1 and FIG. 3 show the results of chronoamperometry measured at various imidazole concentrations. Also, FIG. 4 shows the dependency of the current value (the value of current density 3600 seconds after shown in Table 1 and FIG. 3) on the buffer solution concentration (the concentration of the buffer material in the buffer solution). Table 1 and FIGS. 3 and 4 also show the results when a 1.0 M $NaH_2PO_4$/NaOH buffer solution was used as the buffer solution for comparison. The measurement was performed in the state in which film-formed cellophane 21 was placed on the positive electrode 2, and the buffer solution 22 was put into contact with the cellophane 21 as shown in FIG. 5. As the positive electrode 2, an enzyme/electron mediator-immobilized electrode formed as described below was used. First, commercial carbon felt (manufactured by TORAY, B0050) was used as porous carbon and cut into a 1-cm square. Next, 80 μl of hexacyanoferrate ion (100 mM), 80 μl of poly-L-lysine (1 wt %), and 80 μl (50 mg/ml) of a BOD solution were penetrated in order into the carbon felt, and then dried to form an enzyme/electron mediator immobilized electrode. Two of the enzyme/electron mediator immobilized electrodes produced as described above were stacked to form the positive electrode 2.

TABLE 1

| | Current density (mA/cm$^2$) | | | | | |
|---|---|---|---|---|---|---|
| | 1 sec | 180 sec | 300 sec | 600 sec | 1800 sec | 3600 sec |
| 1.0M NaH$_2$PO$_4$ | −17.22 | −3.11 | −1.10 | −0.73 | −0.41 | −0.34 |
| 0.1M imidazole | −5.64 | −3.98 | −3.71 | −2.98 | −0.70 | −0.54 |
| 0.4M imidazole | −11.18 | −6.37 | −4.69 | −2.48 | −1.35 | −1.16 |
| 1.0M imidazole | −15.59 | −8.44 | −5.81 | −3.86 | −2.60 | −2.32 |
| 2.0M imidazole | −25.10 | −7.39 | −5.88 | −5.01 | −4.20 | −3.99 |
| 4.0M imidazole | −5.08 | −3.90 | −4.19 | −4.53 | −3.47 | −2.13 |

As can be seen from Table 1 and FIG. 3, at the $NaH_2PO_4$ concentration of 1.0 M, an initial current can be obtained, but the current significantly decreases 3600 seconds after. In contrast, particularly at the imidazole concentration of 0.4 M, 1.0 M, and 2.0 M, substantially no decrease in the current is observed 3600 seconds after. As seen from FIG. 4, within the imidazole concentration range of 0.2 to 2.5 M, the current value linearly increases with the concentration. In addition, although the $NaH_2PO_4$/NaOH buffer solution and the imidazole/hydrochloric acid buffer solution have a $pK_a$ of about 7 and substantially the same oxygen solubility, when imidazole is present in the buffer solution at the same concentration, a large oxygen-reduction current is obtained.

After chronoamperometry was performed for 3600 seconds as described above, cyclic voltammetry (CV) was performed between potentials of −0.3 V and +0.6 V. The results are shown in FIG. 6. However, this measurement was performed in the state in which a positive electrode 2 including the same enzyme/electron mediator immobilized electrode as described above was used as a working electrode and placed on an air-permeable PTFE (polytetrafluoroethylene) membrane 23, and a buffer solution 22 was put into contact with the positive electrode 2. A counter electrode 24 and a reference electrode 25 were immersed in the buffer solution 22, and an electrochemical measurement apparatus (not shown) was connected to the positive electrode 2 serving as the working electrode, the counter electrode 24, and the reference electrode 25. A Pt wire was used as the counter electrode 24, and Ag|AgCl was used as the reference electrode 25. The measurement was performed under atmospheric pressure, and the measurement temperature was 25° C. As the buffer solution 22, two types, i.e., an imidazole/hydrochloric acid buffer solution (pH 7, 1.0 M) and a $NaH_2PO_4$/NaOH buffer solution (pH 7, 1.0 M), were used.

FIG. 6 indicates that when the imidazole/hydrochloric acid buffer solution (pH 7, 1.0 M) is used as the buffer solution 22, extremely good CV characteristics are obtained.

It was confirmed from the above results that even if the measurement system is changed, the imidazole buffer solution has superiority.

FIG. 8 shows the results of chronoamperometry performed by the same method as described above using a positive electrode 2 on which BOD was immobilized, a 2.0 M imidazole/hydrochloric acid buffer solution, and a 1.0 M $NaH_2PO_4$/NaOH buffer solution, together with the measurement results of pH on the electrode surface. However, the imidazole/hydrochloric acid buffer solution had a plc, of 6.95, a conductivity of 52.4 mS/cm, an oxygen solubility of 0.25 mM, and a pH of 7, and the $NaH_2PO_4$/NaOH buffer solution had a $pK_a$ of 6.82 ($H_2PO_4^-$), a conductivity of 51.2 mS/cm, an oxygen solubility of 0.25 mM, and a pH of 7. As seen from FIG. 8, when the 2.0 M imidazole/hydrochloric acid buffer solution was used, a current density of as high as about 15 times that in use of the 1.0 M $NaH_2PO_4$/NaOH buffer solution is obtained. Also, FIG. 8 indicates that changes in the current are substantially equal to pH changes on the electrode surface. The reason why these results are obtained is described with reference to FIGS. 9 and 10.

FIGS. 9 and 10 show the state of immobilization of BOD 32 together with an electron mediator 34 on an electrode 31 with a immobilization material 33 such as polyion complex. As shown in FIG. 9, when a 2.0 M imidazole/hydrochloric acid buffer solution is used, it is thought that a sufficiently large amount of protons ($H^+$) is supplied to achieve the high buffer ability, and pH is stabilized, thereby steadily achieving a high current density. In contrast, as shown in FIG. 10, when a 1.0 M $NaH_2PO_4$/NaOH buffer solution is used, it is thought that the buffer ability is insufficient because of a small amount of $H^+$ supplied, and thus pH is significantly increased, thereby decreasing the current density.

FIGS. 11 and 12 show changes in the current density 3600 seconds (1 hour) after with the buffer solution concentration when various buffer solutions were used. As seen from FIGS. 11 and 12, when a buffer solution containing a compound having an imidazole ring is used, a high current density is obtained as a whole as compared with other buffer solutions such as a buffer solution containing $NaH_2PO_4$, and in particular, this tendency becomes significant as the buffer solution concentration increases. Also, FIGS. 11 and 12 indicate that when a buffer solution containing as a buffer material 2-aminoethanol, triethanolamine, TES, or BES is used, a high current density is obtained, and in particular, this tendency becomes significant as the buffer solution concentration increases.

FIGS. 13 and 14 show plots of the current density 3600 seconds after in use of the buffer solutions shown in FIGS. 11 and 12 against the molecular weights and $pK_a$ of the buffer materials.

A specific example of the configuration of the biofuel cell is shown in FIGS. 15A and 15B.

As shown in FIGS. 15A and 15B, the biofuel cell has a configuration in which a negative electrode 1 composed of an enzyme/electron mediator immobilized carbon electrode including the above-describe enzyme and electron mediator immobilized on a 1-$cm^2$ carbon felt with an immobilization material and a positive electrode 2 composed of an enzyme/electron mediator immobilized carbon electrode including an enzyme and an electron mediator immobilized on a 1 $cm^2$ carbon felt with an immobilization material are opposed to each other through an electrolyte layer 3 containing as a buffer material a compound having an imidazole ring or 2-aminoethanol hydrochloride. In this case, Ti current collectors 41 and 42 are disposed below the positive electrode 2 and above the negative electrode 1, respectively, so that a current can be easily collected. Reference numerals 43 and 44 each denote a fixing plate. The fixing plates 43 and 44 are fastened together with screws 45 so that the positive electrode 2, the negative electrode 1, the electrolyte layer 3, and the Ti current collectors 41 and 42 are sandwiched between the fixing plates 43 and 44. In addition, a circular recess 43a for air intake is provided on one (outer side) of the surfaces of the fixing plate 43, and many holes 43b are provided at the bottom of the recess 43a so as to pass to the other surface. These holes 43b serve as air supply passages to the positive electrode 2. On the other hand, a circular recess 44a for fuel charge is provided on one (outer side) of the surfaces of the fixing plate 44, and many holes 44b are provided at the bottom of the recess 44a so as to pass to the other surface. These holes 44b serve as fuel supply passages to the negative electrode 1. Further, a spacer 46 is provided on the periphery of the other surface of the fixing plate 44 so that the fixing plates 43 and 44 are fastened together by the screws 45 with a predetermined space therebetween.

As shown in FIG. 15B, a load 47 was connected between the Ti current collectors 41 and 42, and a glucose/buffer solution is placed as fuel in the recess 44a of the fixing plate 44, for electric power generation. As the buffer solution, two types, i.e., a 2.0 M imidazole/hydrochloric acid buffer solution (pH 7) and a 1.0 M $NaH_2PO_4$/NaOH buffer solution (pH 7), were used. The glucose concentration was 0.4 M. The operation temperature was 25° C. FIG. 16 shows output characteristics. As shown in FIG. 16, when the 2.0 M imidazole/hydrochloric acid buffer solution was used as the buffer solution, the output (electric power density) is about 2.4 times as large as that in the case in which the $NaH_2PO_4$/NaOH buffer solution was used.

As described above, according to the first embodiment, the electrolyte layer 3 contains as the buffer material a compound having an imidazole ring, and thus a sufficient buffer ability can be achieved. Therefore, even when the proton amount varies in a proton electrode or in an enzyme-immobilized membrane by enzymatic reaction through proton during a high-output operation of the biofuel cell, a sufficient buffer function can be achieved, and deviation of pH of the electrolyte around the enzyme from optimum pH can be sufficiently suppressed. Therefore, the original ability of the enzyme can be sufficiently exhibited, and an electrode reaction of the enzyme, the coenzyme, the electron mediator, and the like can be efficiently steadily effected. Consequently, a high-performance biofuel cell capable of high-output operation can be realized. The biofuel cell is preferably applied to power supplies for various electronic apparatuses, mobile bodies, power generating systems, and the like.

Next, a biofuel cell according to a second embodiment of the present invention is described.

In the biofuel cell, an electrolyte layer 3 has charge with the same sign as that of charge of an oxidized or reduced form of an electron mediator used on a positive electrode 2 and a negative electrode 1. For example, the surface of the electrolyte layer 3 on at least the positive electrode 2 side is negatively charged and has negative charge. Specifically, for example, the whole or part of at least the positive electrode 2 side-portion of the electrolyte layer 3 contains polyanion having negative charge. As the polyanion, preferably, Nafion (trade name, US DuPont) which is an ion exchange resin containing fluorine-containing carbon sulfonic acid groups is used.

Here, description is made of the results of a comparative experiment carried out for proving that when the electrolyte layer 3 has charge with the same sign as that of charge of an oxidized or reduced form of the electron mediator, an oxidized or reduced form of the electron mediator can be prevented from permeating through the electrolyte layer 3.

First, two commercial glassy carbon (GC) electrodes (diameter 3 mm) were prepared and both polished and washed. Next, 5 µl of an emulsion (20%) of commercial Nafion as polyanion was added to one of the glassy carbon electrodes and dried. Next, the two glassy carbon electrodes were immersed in a 1 mM hexacyanoferrate ion (polyvalent anion) aqueous solution (50 mM $NaH_2PO_4$/NaOH buffer solution, pH 7), and cyclic voltammetry (CV) was performed at a sweep rate of 20 $mVs^{-1}$. The results are shown in FIG. 17A. FIG. 17B is an enlarged view of the CV curve obtained by using the glassy carbon electrode containing Nafion shown in FIG. 17A. As seen from FIGS. 17A and 17B, in the glassy carbon electrode containing Nafion, the oxidation-reduction peak current due to hexacyanoferrate ion serving as the electron mediator is 1/20 or less of that of the glassy carbon electrode not containing Nafion. This indicates that the hexacyanoferrate ion as polyvalent anion having negative charge like in Nafion as polyanion having negative charge do not diffuse and permeate.

Next, commercial carbon felt (manufactured by TORAY, B0050) was used as porous carbon and cut into a 1-cm square, and 80 μl of hexacyanoferrate ion (1 M) was penetrated into the carbon felt and then dried. Two of the thus-formed electrodes were stacked to form a test electrode. As shown in FIG. 18, a film-formed separator 16 (corresponding to the electrolyte layer 3) was placed on the test electrode 15, and a working electrode 17 was provided opposite to the test electrode 15 with the separator 16 provided therebetween. As the working electrode 17, a commercial carbon felt (manufactured by TORAY, B0050) cut into a 1-cm square was used. Then, a 0.4 M $NaH_2PO_4$/NaOH (pH 7) buffer solution 18 in which hexacyanoferrate ion was dissolved as an electron mediator (a vessel containing the buffer solution 18 is not shown) was brought into contact with the separator 16 and the working electrode 17. As the separator 16, cellophane having no charge and Nafion (pH 7) as polyanion having negative charge were used. Cyclic voltammetry was performed 5 minutes, 1 hour, and 2 hours after the contact between the separator 16 and the buffer solution 18 (electrolytic solution) in which hexacyanoferrate ion was dissolved, and the oxidation-reduction peak values of the electron mediator, i.e., hexacyanoferrate ion, permeating through the separator 16 from the test electrode 15 were compared. A counter electrode 19 and a reference electrode 20 were immersed in the buffer solution 18, and an electrochemical measurement apparatus (not shown) was connected to the working electrode 17, the counter electrode 19, and the reference electrode 20. A Pt wire was used as the counter electrode 19, and Ag|AgCl was used as the reference electrode 20. The measurement was performed under atmospheric pressure, and the measurement temperature was 25° C. FIG. 19 shows the results of measurement using Nafion as the separator 16. In addition, FIG. 20 shows the results of measurement using cellophane as the separator 16. As seen from FIGS. 19 and 20, when cellophane was used as the separator 16, an oxidation-reduction peak of hexacyanoferrate ion is observed 5 minutes after the start of measurement, and the oxidation-reduction peak value increases with the passage of time, while when Nafion was used as the separator 16, an oxidation-reduction peak of hexacyanoferrate ion is not observed even after the passage of 2 hours from the start of measurement. Therefore, it was confirmed that when cellophane is used as the separator 16, hexacyanoferrate ion permeates through the separator 16, while when Nafion is used as the separator 16, hexacyanoferrate ion does not permeate through the separator 16.

According to the second embodiment, in addition to the same advantages as in the first embodiment, the following advantage can be obtained. That is, since the electrolyte layer 3 has charge with the same sign as that of charge of an oxidized or reduced form of the electron mediator used on the positive electrode 2 and the negative electrode 1, the electron mediator on one of the positive electrode 2 and the negative electrode 1 can be effectively prevented from permeating through the electrolyte layer 3 and moving to the other of the positive electrode 2 and the negative electrode 1. Therefore, decrease in output of the biofuel cell and decrease in electric capacitance can be sufficiently suppressed.

Next, a biofuel cell according to a third embodiment is described.

FIGS. 21A, 21B, 21C and 22 show the biofuel cell, and FIGS. 21A, 21B, and 21C are a top view, a sectional view, and a rear view, respectively, of the biofuel cell, and 22 is an exploded perspective view showing exploded components of the biofuel cell.

As shown in FIGS. 21A, 21B, 21C, and 22, the biofuel cell includes a positive electrode 2, an electrolyte layer 3, and a negative electrode 1 which are accommodated in a space formed by a positive electrode current collector 51 and a negative electrode current collector 52 so as to be vertically sandwiched between the positive electrode current collector 51 and the negative electrode current collector 52. The positive electrode current collector 51, the negative electrode current collector 52, the positive electrode 2, the electrolyte layer 3, and the negative electrode 1 are brought into tight contact between adjacent ones. In this case, the positive electrode current collector 51, the negative electrode current collector 52, the positive electrode 2, the electrolyte layer 3, and the negative electrode 1 have a circular planar shape, and the whole biofuel cell also has a circular planar shape.

The positive electrode current collector 51 is adapted for collecting a current produced in the positive electrode 2, and the current is taken out to the outside from the positive electrode current collector 51. The negative electrode current collector 52 is adapted for collecting a current produced in the negative electrode 1. The positive electrode current collector 51 and the negative electrode current collector 52 are generally made of a metal or an alloy, but the material is not limited to this. The positive electrode current collector 51 is flat and has a substantially cylindrical shape. Also, the negative electrode current collector 52 is flat and has a substantially cylindrical shape. The outer peripheral edge 51a of the positive electrode current collector 51 is caulked to the outer periphery 52a of the negative electrode current collector 52 through a ring-shaped gasket 56a made of an insulating material, such as silicone rubber, and a ring-shaped hydrophobic resin 56b made of, for example, polytetrafluoroethylene (PTFE), thereby forming a space in which the positive electrode 2, the electrolyte layer 3, and the negative electrode 1 are accommodated. The hydrophobic resin 56b is provided in the space surrounded by the positive electrode 2, the positive electrode current collector 51, and the gasket 56a so as to be in tight contact with the positive electrode 2, the positive electrode current collector 51, and the gasket 56a. The hydrophobic resin 56b an effectively suppress excessive permeation of fuel into the positive electrode 2. The end of the electrolyte layer 3 extends outward from the positive electrode 2 and the negative electrode 1 so as to be held between the gasket 56a and the hydrophobic resin 56b. The positive electrode current collector 51 has a plurality of oxidizer supply ports 51b provided over the entire surface of the bottom so that the positive electrode 2 is exposed in the oxidizer supply ports 51b. FIGS. 21C and 22 show thirteen circular oxidizer supply ports 51b, but this is an only example, and the number, the shape, the size, and the arrangement of the oxidizer supply ports 51b can be appropriately selected. The negative electrode current collector 52 also has a plurality of fuel supply ports 52b provided over the entire surface of the top so that the negative electrode 1 is exposed in the fuel supply ports 52b. FIG. 22 shows nine circular fuel supply ports 52b, but this is an only example, and the number, the shape, the size, and the arrangement of the fuel supply ports 52b can be appropriately selected.

The negative electrode current collector 52 has a cylindrical fuel tank 57 provided on the side opposite to the negative electrode 1. The fuel tank 57 is formed integrally with the negative electrode current collector 52. The fuel tank 57 contains fuel to be used (not shown), for example, a glucose solution or a glucose solution containing an electrolyte. In addition, a cylindrical cover 58 is detachably provided on the fuel tank 57. The cover 58 is inserted into or screwed on the fuel tank 57. Further, a circular fuel supply port 58a is formed at the center of the cover 58. The fuel supply port 58a is sealed by, for example, attaching a seal not shown.

The other configuration of the biofuel cell is the same as the first embodiment as long as they are not adverse to the properties.

Next, an example of the method for producing the biofuel cell is described. The production method is shown in FIGS. 23A to 23D.

As shown in FIG. 23A, first, the positive electrode current collector 51 having a cylindrical shape with an open end is prepared. The positive electrode current collector 51 has a plurality of oxidizer supply ports 51b provided over the entire surface of the bottom. The ring-shaped hydrophobic resin 56b is placed on the outer periphery of the bottom in the positive electrode current collector 51, and the positive electrode 2, the electrolyte layer 3, and the negative electrode 1 are stacked in order on the central portion of the bottom.

On the other hand, as shown in FIG. 23B, the negative electrode current collector 52 having a cylindrical shape with an open end is prepared, the cylindrical fuel tank 57 being integrally formed on the negative electrode current collector 52. The negative electrode current collector 52 has a plurality of fuel supply ports 52b provided over the entire surface thereof. Then, the gasket 56a having a U-like sectional shape is attached to the edge of the peripheral surface of the negative electrode current collector 52. Then, the negative electrode current collector 52 is placed on the negative electrode 1 so that the open side faces downward, and the positive electrode 2, the electrolyte layer 3, and the negative electrode 1 are held between the positive electrode current collector 51 and the negative electrode current collector 52.

Next, as shown in FIG. 23C, the positive electrode current collector 51 and the negative electrode current collector 52 with the positive electrode 2, the electrolyte layer 3, and the negative electrode 1 sandwiched therebetween are placed on a base 61 of a caulking machine, and the negative electrode current collector 52 is pressed with a pressing member 62 to bring the positive electrode current collector 51, the positive electrode 2, the electrolyte layer 3, the negative electrode 1, and the negative electrode current collector 52 into tight contact between adjacent ones. In this state, a caulking tool 63 is lowered to caulk the edge of the peripheral portion 51a of the positive electrode current collector 51 to the peripheral portion 52a of the negative electrode current collector 52 through the gasket 56a and the hydrophobic resin 56b. The caulking is performed so as to gradually crush the gasket 56a, thereby forming no space between the positive electrode current collector 51 and the gasket 56a and between the negative electrode current collector 52 and the gasket 56a. In this case, the hydrophobic resin 56b is also gradually compressed so as to be brought into tight contact with the positive electrode 2, the positive electrode current collector 51, and the gasket 56a. Therefore, the positive electrode current collector 51 and the negative electrode current collector 52 are electrically insulated from each other through the gasket 56a, forming a space therebetween in which the positive electrode 2, the electrolyte layer 3 and the negative electrode 1 are accommodated. Then, the caulking tool 63 is moved upward.

As a result, as shown in FIG. 23D, the biofuel cell is manufactured, in which the positive electrode 2, the electrolyte layer 3, and the negative electrode 1 are accommodated in the space formed by the positive electrode current collector 51 and the negative electrode current collector 52.

Next, the cover 58 is attached to the fuel tank 57, and the fuel and the electrolyte are injected through the fuel supply port 58a of the cover 58. Then, a sealing seal is attached to the fuel supply port 58a to close it. However, the fuel and electrolyte may be injected into the fuel tank 57 in the step shown in FIG. 23B.

In the biofuel cell, for example, when a glucose solution is used as the fuel to be charged in the fuel tank 57, on the negative electrode 1, the glucose supplied is decomposed with the enzyme to taken out electrons and produce $H^+$. On the positive electrode 2, water is produced from $H^+$ transferred from the negative electrode 1 through the electrolyte layer 3, the electrons transferred from the negative electrode 1 through an external circuit, and oxygen, for example, air oxygen. As a result, an output voltage is produced between the positive electrode current collector 51 and the negative electrode current collector 52.

As shown in FIG. 24, mesh electrodes 71 and 72 may be formed on the positive electrode current collector 51 and the negative electrode current collector 52, respectively, in the biofuel cell. In this case, outside air enters the oxidizer supply ports 51b of the positive electrode current collector 51 through holes of the mesh electrode 71, and fuel enters the fuel tank 57 from the fuel supply port 58a of the cover 58 through holes of the mesh electrode 72.

FIG. 25 shows a case in which two biofuel cells are connected in series. In this case, a mesh electrode 73 is sandwiched between the positive electrode current collector 51 of one (in the drawing, the upper biofuel cell) of the biofuel cells and the cover 58 of the other biofuel cell (in the drawing, the lower biofuel cell). Therefore, outside air enters the oxidizer supply ports 51b of the positive electrode current collector 51 through holes of the mesh electrode 73. The fuel can be supplied using a fuel supply system.

FIG. 26 shows a case in which two biofuel cells are connected in parallel. In this case, the fuel tank 57 of one (in the drawing, the upper biofuel cell) of the two biofuel cells and the fuel tank 57 of the other biofuel cell (in the drawing, the lower biofuel cell) were brought into contact with each other so that the fuel supply ports 58a of the covers 58 coincide with each other, and an electrode 74 is drawn out from the sides of the fuel tanks 57. In addition, mesh electrodes 75 and 76 are formed on the positive electrode current collector 51 of one of the biofuel cells and the positive electrode current collector 51 of the other biofuel cell. These mesh electrodes 75 and 76 are connected to each other. Outside air enters the oxidizer supply ports 51b of the positive electrode current collectors 51 through holes of the mesh electrodes 75 and 76.

In accordance with the third embodiment, in the coil-type or button-type biofuel cell excluding the fuel tank 57, the same advantages as in the first embodiment can be obtained. In addition, in the biofuel cell, the positive electrode 2, the electrolyte layer 3, and the negative electrode 1 are sandwiched between the positive electrode current collector 51 and the negative electrode current collector 52, and the edge of the outer periphery 51a of the positive electrode current collector 51 is caulked to the outer periphery 52a of the negative electrode current collector 52 through the gasket 56a. In the biofuel cell, the components can be uniformly bonded together, thereby preventing variation in output and leakage of the cell solution such as the fuel and the electrolyte from the interfaces between the respective components. In addition, the biofuel cell is manufactured by a simple manufacturing process, and the biofuel cell can be easily reduced in size. Further, the biofuel cell uses the glucose solution and starch as fuel, and about pH 7 (neutral) is selected as the pH of the electrolyte used so that the biofuel cell is safe even if the fuel and the electrolyte leak to the outside.

Further, in an air cell which is currently put into practical use, fuel and an electrolyte must be added during manufacture, thereby causing difficulty in adding the fuel and electrolyte after manufacture, while in the biofuel cell, the fuel and electrolyte can be added after manufacture, thereby facilitating the manufacture as compared with an air cell which is currently put into practical use.

Next, a biofuel cell according to a fourth embodiment will be described.

As shown in FIG. 27, in accordance with the fourth embodiment, the fuel tank 57 provided integrally with the negative electrode current collector 52 is removed from the biofuel cell according to the third embodiment, and further, the mesh electrodes 71 and 72 are formed on the positive electrode current collector 51 and the negative electrode current collector 52, respectively, so that when used, the biofuel cell floats on the fuel 57a charged in an open fuel tank 57 with the negative electrode 1 disposed on the lower side and the positive electrode 2 disposed on the upper side.

The other characteristics of the fourth embodiment are the same as in the first and third embodiments as long as they are not adverse to the properties.

In accordance with the fourth embodiment, the same advantages as those of the first and third embodiments can be obtained.

Next, a biofuel cell according to a fifth embodiment of the present invention will be described. Although the biofuel cell according to the third embodiment is a coin or button type, the biofuel cell of the fifth embodiment is a cylindrical type.

FIGS. 28A, 28B, and 29 show the biofuel cell, FIGS. 28A and 28B are a front view and a longitudinal sectional view, respectively, of the biofuel cell, and FIG. 29 is an exploded perspective view showing the exploded components of the biofuel cell.

As shown in FIGS. 28A, 28B, and 29, in the biofuel cell, a cylindrical negative electrode current collector 52, negative electrode 1, electrolyte layer 3, positive electrode 2, and positive electrode current collector 51 are provided in order on the outer periphery of a cylindrical fuel holding portion 77. In this case, the fuel holding portion 77 includes a space surrounded by the cylindrical negative electrode current collector 52. An end of the fuel holding portion 77 projects outward, and a cover 78 is provided on the end. Although not shown in the drawings, a plurality of fuel supply ports 52b is formed over the entire surface of the negative electrode current collector 52 provided on the outer periphery of the cylindrical fuel holding portion 77. In addition, the electrolyte layer 3 is formed in a bag shape which wraps the negative electrode 1 and the negative electrode current collector 52. The portion between the electrolyte layer 3 and the negative electrode current collector 52 at an end of the fuel holding portion 77 is sealed with, for example, a sealing member (not shown) so as to prevent fuel leakage from the portion.

In the biofuel cell, a fuel and electrolyte are charged in the fuel holding portion 77. The fuel and electrolyte pass through the fuel supply ports 52b of the negative electrode current collector 52, reach the negative electrode 1, and permeates into voids of the negative electrode 1 to be stored in the negative electrode 1. In order to increase the amount of the fuel stored in the negative electrode 1, the porosity of the negative electrode 1 is preferably, for example, 60% or more, but is not limited to this.

In the biofuel cell, a vapor-liquid separation layer may be provided on the outer periphery of the positive electrode current collector 51 in order to improve durability. As a material for the vapor-liquid separation layer, for example, a waterproof moisture-permeable material (a composite material of polyurethane polymer and a stretched polytetrafluoroethylene film) (e.g., Gore-Tex (trade name) manufactured by WL Gore & Associates) is used. In order to uniformly bond together the components of the biofuel cell, preferably, stretchable rubber (may be a band or sheet) having a network structure permeable to outside air is wound inside or outside the vapor-liquid separation layer, for compressing the whole of the components of the biofuel cell.

The other characteristics of the fifth embodiment are the same as in the first and third embodiments as long as they are not adverse to the properties.

In accordance with the fifth embodiment, the same advantages as those of the first and third embodiments can be obtained.

Next, a biofuel cell according to a sixth embodiment will be described.

The biofuel cell according to the sixth embodiment has the same configuration as the biofuel cell according to the first embodiment except that a porous conductive material as shown in FIGS. 30A and 30B is used as a material of the electrode 11 of the negative electrode 1.

FIG. 30A schematically shows a structure of the porous conductive material, and FIG. 30B is a sectional view of a skeleton of the porous conductive material. As shown in FIGS. 30A and 30B, the porous conductive material includes a skeleton 81 composed of a porous material with a three-dimensional network structure, and a carbon-based material 82 coating the surface of the skeleton 81. The porous conductive material has a three-dimensional network structure in which many holes 83 surrounded by the carbon-based material 82 correspond to meshes. In this case, the holes 83 communicate with each other. The carbon-based material 82 may be any one of forms, such as a fibrous form (needle-like), a granular form, and the like.

The skeleton 81 composed of the porous material is made of a foamed metal or foamed alloy, for example, foamed nickel. The porosity of the skeleton 81 is generally 85% or more and more generally 90% or more, and the pore size is generally, for example, 10 nm to 1 mm, more generally 10 nm to 600 μm, still more generally 1 to 600 μm, typically 50 to 300 μm, and more typically 100 to 250 μm. As the carbon-based material 82, for example, a high-conductivity material such as Ketjenblack is preferred, but a functional carbon material such as carbon nanotubes, fullerene, or the like may be used.

The porosity of the porous conductive material is generally 80% or more and more generally 90% or more, and the pore size of the pores 83 is generally, for example, 9 nm to 1 mm, more generally 9 nm to 600 μm, still more generally 1 to 600 μm, typically 30 to 400 μm, and more typically 80 to 230 μm.

Next, a method for producing the porous conductive material will be described.

As shown in FIG. 31A, first, the skeleton 81 composed of a foamed metal or a foamed alloy (e.g., foamed nickel) is prepared.

Next, as shown in FIG. 31B, the surface of the skeleton 81 composed of a foamed metal or foamed alloy is coated with the carbon-based material 82. As the coating method, a general coating method can be used. For example, an emulsion containing carbon powder and an appropriate binder is sprayed on the surface of the skeleton 81 using a spray to coat the surface with the carbon-based material 82. The coating thickness of the carbon-based material 82 is determined according to the porosity and pore size required for the porous conductive material in consideration of the porosity and pore size of the skeleton 82 composed of a foamed metal or foamed alloy. The coating is performed so that many holes 83 surrounded by the carbon-based material 82 communicate with each other.

As a result, the intended porous conductive material is produced.

According to the fourth embodiment, the porous conductive material including the skeleton 81 composed of a foamed metal or foamed alloy with the surface coated with the carbon-based material 82 can have sufficiently large holes 83, a coarse three-dimensional network structure, high strength, high conductivity, and a sufficiently high surface area. Therefore, when the electrode 11 is formed using the porous conductive material, an enzyme metabolism reaction can be effected with high efficiency on the negative electrode 1 including an enzyme, a coenzyme, an electron mediator immobilized on the electrode 11, or an enzyme reaction phenomenon taking place near the electrode 11 can be efficiently captured as an electrical signal. In addition, it is possible to realize a biofuel cell with high performance and safety regardless of operation environments.

Next, a biofuel cell according to a seventh embodiment will be described.

The biofuel cell uses starch which is a polysaccharide as fuel. In addition, glucoamylase which is a catabolic enzyme decomposing starch into glucose is also immobilized on the negative electrode 1 in association with the use of starch as the fuel.

In the biofuel cell, when starch is supplied as the fuel to the negative electrode 1, the starch is hydrolyzed into glucose with glucoamylase, and the glucose is decomposed with glucose dehydrogenase. Further, $NAD^+$ is reduced in association with oxidation reaction in the decomposition process to produce NADH which is separated into two electrons, $NAD^+$, and $H^+$ by oxidation with diaphorase. Therefore, two electrons and two $H^+$ are produced in one step of oxidation reaction per molecular of glucose, and four electrons and four $H^+$ in total are produced in two steps of oxidation reaction. The thus-produced electrons are transferred to the electrode 11 of the negative electrode 1, and $H^+$ moves to the positive electrode 2 through the electrolyte layer 3. On the positive electrode 2, $H^+$ reacts with oxygen supplied from the outside and the electrons supplied from the negative electrode 1 through an external circuit to produce $H_2O$.

The other characteristics of the seventh embodiment are the same as the biofuel cell according to the first embodiment.

In accordance with the seventh embodiment, the same advantages as those of the first embodiment can be obtained, and it is possible to obtain the advantage that since starch is used as the fuel, the amount of electricity generated can be increased as compared with when glucose is used as fuel.

The numerical values, structures, configurations, shapes, and materials given in the above-described embodiments are only examples, and different numerical values, structures, configurations, shapes, and materials may be used according to demand.

In addition, in a conventional biofuel cell, the selection of an electron mediator functioning to transfer electrons between an enzyme and an electrode greatly affects the output of the cell. Namely, there is a problem that when an electron mediator having a small difference in free energy from a substrate is selected for increasing the output voltage of the cell, a current value cannot be obtained, and conversely, when an electron mediator having a large difference in free energy from a substrate is selected, the current capacity is decreased. This problem can be solved by simultaneously using two or more types of electron mediators having different oxidation-reduction potentials on the negative electrode 1 and/or the positive electrode 2 so that both the high output voltage and high current can be properly used. In this case, the oxidation-reduction potentials of the two or more types of electron mediators are 50 mV or more, more preferably 100 mV or more, and still more preferably 200 mV or more different from each other at pH 7. In this way, when two or more types of electron mediators are used as electron mediators immobilized on the negative electrode 1 or the positive electrode 2, it is possible to realize a biofuel cell capable of a cell operation at a high potential with a small energy loss when a low output is required and capable of resisting high output with a large energy loss when a high output is required.

FIG. 32 shows the results of cyclic voltammetry using 0.1M $NaH_2PO_4$/NaOH buffer solutions (pH 7) respectively containing only 100 μM VK3 (vitamin K3), only 100 μM ANQ, and 100 μM of each of VK3 and ANQ. The oxidation-reduction potentials of VK3 and ANQ at pH 7 are −0.22 V and −0.33 V (vs. Ag|AgCl), respectively, and a difference between both oxidation-reduction potentials is 0.11 V (110 mV). Then, after each of the solutions was adjusted so that the NADH concentration was 5 mM, and the concentration of enzyme diaphorase was 0.16 μM, cyclic voltammetry was performed. The results are also shown in FIG. 32. As seen from FIG. 32, when VK3 and ANQ having a difference of 110 mV in oxidation-reduction potential at pH 7 are used as electron mediators, a high output voltage and a high output current can be realized as compared with the case in which VK3 and ANQ are separately used.

FIG. 33 shows the results of cyclic voltammetry using 0.1M $NaH_2PO_4$/NaOH buffer solutions (pH 7) respectively containing only 100 μM VK3, only 100 μM AQS, and 100 μM of each of VK3 and AQS. The oxidation-reduction potentials of VK3 and AQS at pH 7 are −0.22 V and −0.42 V (vs. Ag|AgCl), respectively, and a difference between both oxidation-reduction potentials is 0.2 V (200 mV). Then, after each of the solutions was adjusted so that the NADH concentration was 5 mM, and the concentration of enzyme diaphorase was 0.16 μM, cyclic voltammetry was performed. The results are also shown in FIG. 33. As seen from FIG. 33, when VK3 and AQS having a difference of 200 mV in oxidation-reduction potential at pH 7 are used as electron mediators, a high output voltage and a high output current can be realized as compared with the case in which VK3 and AQS are separately used.

FIG. 34 shows the results of cyclic voltammetry using 0.1M $NaH_2PO_4$/NaOH buffer solutions (pH 7) respectively containing only 100 μM ANQ, only 100 μM AQS, and 100 μM of each of ANQ and AQS. The oxidation-reduction potentials of ANQ and AQS at pH 7 are −0.33 V and −0.42 V (vs. Ag|AgCl), respectively, and a difference between both oxidation-reduction potentials is 0.09 V (90 mV). Then, after each of the solutions was adjusted so that the NADH concentration was 5 mM, and the concentration of enzyme diaphorase was 0.16 μM, cyclic voltammetry was performed. The results are also shown in FIG. 34. As seen from FIG. 34, when ANQ and AQS having a difference of 90 mV in oxidation-reduction potential at pH 7 are used as electron mediators, a high output voltage and a high output current can be realized as compared with the case in which ANQ and AQS are separately used.

In addition, as described above, the use of two or more types of electron mediators having different oxidation-reduction potentials is effective in applying to not only a biofuel cell using an enzyme but also a biofuel cell using microorganisms or cells and an electron mediator, and more generally effective in applying to general electrode reaction-using apparatuses (a biofuel cell, a biosensor, a bioreactor, and the like) using electron mediators.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A fuel cell comprising:
a structure in which a positive electrode and a negative electrode are opposed to each other with an electrolyte containing a buffer material provided therebetween; and an enzyme being immobilized on at least one of the positive electrode and the negative electrode, wherein the buffer material contains hydrochloric acid and a compound including an imidazole ring.

2. The fuel cell according to claim 1, wherein a concentration of the compound containing an imidazole ring in the buffer material is 0.2 M to 2.5 M.

3. The fuel cell according to claim 1, wherein an electron mediator in addition to the enzyme is immobilized on at least one of the positive electrode and the negative electrode.

4. The fuel cell according to claim 3, wherein the electron mediator comprises at least two electron mediators each having a different oxidation-reduction potential.

5. The fuel cell according to claim 1, wherein the enzyme includes an oxidase which is immobilized on the negative electrode and which promotes oxidation of a monosaccharide and decomposes the monosaccharide.

6. The fuel cell according to claim 5, wherein the enzyme includes a coenzyme oxidase which returns a coenzyme reduced in association with the oxidation of the monosaccharide to an oxidized form and which supplies electrons to the negative electrode through an electron mediator.

7. The fuel cell according to claim 6, wherein the oxidized form of the coenzyme is $NAD^+$, and the coenzyme oxidase is diaphorase.

8. The fuel cell according to claim 5, wherein the oxidase is $NAD^+$-dependent glucose dehydrogenase.

9. The fuel cell according to claim 1, wherein the enzyme includes a catabolic enzyme which is immobilized on the negative electrode and promotes decomposition of a polysaccharide to produce a monosaccharide and an oxidase which promotes oxidation of the produced monosaccharide and decomposes it.

10. The fuel cell according to claim 9, wherein the catabolic enzyme is glucoamylase, and the oxidase is $NAD^+$-dependent glucose dehydrogenase.

11. The fuel cell according to claim 1, wherein the enzyme contains an oxygen-reductase immobilized on the positive electrode.

12. The fuel cell according to claim 11, wherein the oxygen-reductase is bilirubin oxidase.

13. The fuel cell according to claim 1, wherein a concentration of the buffer material is 0.4 M to 2.0 M.

14. The fuel cell according to claim 1, wherein a pH of the buffer material is approximately 7.

15. An electronic apparatus comprising:
at least one fuel cell,
wherein at least one of the fuel cells includes a structure in which a positive electrode and a negative electrode are opposed to each other with an electrolyte containing a buffer material provided therebetween, an enzyme being immobilized on at least one of the positive electrode and the negative electrode, and
wherein the buffer material contains hydrochloric acid and a compound including an imidazole ring.

16. A fuel cell comprising:
a structure in which a positive electrode and a negative electrode are opposed to each other with an electrolyte containing a buffer material provided therebetween, an enzyme being immobilized on at least one of the positive electrode and the negative electrode,
wherein the buffer material contains hydrochloric acid and at least one selected from the group consisting of 2-aminoethanol, triethanolamine, N-tris(hydroxymethyl)methyl-2-aminoethanesulfonic acid, and N,N-bis(2-hydroxyethyl)-2-aminoethanesulfonic acid.

* * * * *